(12) United States Patent
Tripathi et al.

(10) Patent No.: US 8,891,543 B1
(45) Date of Patent: Nov. 18, 2014

(54) METHOD AND SYSTEM FOR PROCESSING PACKETS IN A NETWORK DEVICE

(75) Inventors: Sunay Tripathi, Los Altos, CA (US); Robert James Drost, Los Altos, CA (US); Chih-Kong Ken Yang, Pacific Palisades, CA (US)

(73) Assignee: Pluribus Networks Inc., Palo Alto, CA (US)

( * ) Notice: Subject to any disclaimer, the term of this patent is extended or adjusted under 35 U.S.C. 154(b) by 163 days.

(21) Appl. No.: 13/478,179

(22) Filed: May 23, 2012

Related U.S. Application Data

(60) Provisional application No. 61/489,085, filed on May 23, 2011.

(51) Int. Cl.
*H04L 12/56* (2006.01)

(52) U.S. Cl.
USPC .......................................... 370/412; 370/474

(58) Field of Classification Search
CPC ......... H04L 47/22; H04L 45/00; H04L 49/90; H04L 2012/5681; H04L 12/54; H04L 12/56
USPC .............. 370/229, 230, 230.1, 254, 351, 389, 370/412, 464, 474
See application file for complete search history.

(56) References Cited

U.S. PATENT DOCUMENTS

| | | | |
|---|---|---|---|
| 7,830,793 B2 | 11/2010 | Gai et al. | |
| 7,937,101 B2 | 5/2011 | Corke | |
| 7,962,647 B2 | 6/2011 | Suri et al. | |
| 8,274,896 B2 | 9/2012 | Lakshmikantha et al. | |
| 8,284,692 B2 | 10/2012 | Arye | |
| 8,374,175 B2 | 2/2013 | Riley | |
| 8,396,053 B2 | 3/2013 | Giles | |
| 8,424,005 B2 | 4/2013 | Strom et al. | |
| 8,451,854 B1 | 5/2013 | Sayrafian-Pour | |
| 8,451,867 B2 | 5/2013 | Dowd | |
| 8,578,076 B2 | 11/2013 | van der Linden et al. | |
| 2002/0065938 A1* | 5/2002 | Jungck et al. ................ | 709/246 |
| 2006/0092921 A1* | 5/2006 | Narayanan et al. .......... | 370/352 |
| 2008/0209104 A1* | 8/2008 | Tanaka et al. ................ | 711/100 |
| 2009/0092136 A1* | 4/2009 | Nazareth et al. ............. | 370/392 |
| 2009/0150529 A1 | 6/2009 | Tripathi | |
| 2009/0150883 A1 | 6/2009 | Tripathi et al. | |
| 2010/0290348 A1* | 11/2010 | Stanislaus et al. ........... | 370/245 |
| 2010/0325257 A1 | 12/2010 | Goel et al. | |
| 2011/0103259 A1* | 5/2011 | Aybay et al. ................. | 370/254 |
| 2012/0195208 A1* | 8/2012 | Abel et al. .................... | 370/252 |
| 2012/0250502 A1* | 10/2012 | Brolin .......................... | 370/230 |

FOREIGN PATENT DOCUMENTS

WO 2006124414 A2 11/2006

* cited by examiner

*Primary Examiner* — Obaidul Huq
(74) *Attorney, Agent, or Firm* — Martine Penilla Group, LLP

(57) ABSTRACT

In general, the invention relates to a network device that includes a port configured to receive a packet and a packet processor (PP) configured to receive the packet from the port, in response to receiving the packet, make a first determination that a trigger condition exists, and in response to the first determination, issue a configuration action, where the configuration action, when performed by the network device, modifies a configuration of a component on the network device.

25 Claims, 14 Drawing Sheets

METHOD AND SYSTEM FOR PROCESSING PACKETS IN A NETWORK DEVICE

CROSS-REFERENCE TO RELATED APPLICATIONS

This application claims benefit under 35 U.S.C. §119(e) to U.S. Provisional Application Ser. No. 61/489,085 entitled "Low Latency Network Fabric" filed on May 23, 2011. U.S. Provisional Application Ser. No. 61/489,085 is hereby incorporated by referenced in its entirety.

BACKGROUND

Network devices transmit data within or between networks. Network devices such as switches and routers have limited functionality to monitor the flow of packets in a network. As a result of this limited functionality, switches and routers have a limited ability to control and manage the flow of packets through a network.

SUMMARY

In general, in one aspect, the invention relates to a network device. The network device includes a port configured to receive a packet, a packet processor (PP) configured to receive the packet from the port, in response to receiving the packet, make a first determination that a trigger condition exists; and in response to the first determination, issue a configuration action, where the configuration action, when performed by the network device, modifies a configuration of a component on the network device.

In general, in one aspect, the invention relates to a network device, comprising, a port configured to receive a packet, an Ethernet switch configured to receive the packet from the port and in response to a first determination that the packet satisfies a rule, sending the packet to a packet processor, the packet processor (PP) configured to, receive the packet from the Ethernet switch, in response to receiving the packet, make a second determination that a trigger condition exists, and in response to the second determination, issue a configuration action, wherein the configuration action, when performed by the network device, modifies a configuration of a component on the network device, wherein the PP is not directly connected to any port of the network device.

In general, in one aspect, the invention relates to a network device, comprising a port configured to receive a packet, an Ethernet switch configured to receive the packet from the port, and in response to a first determination that the packet satisfies a rule, sending the packet to a packet processor, the packet processor (PP) configured to receive the packet from the Ethernet switch in response to receiving the packet, processing the packet by a virtual traffic shaper (VTS) on the PP, and sending the packet to the Ethernet switch after the packet has been processed by the VTS, wherein the PP is not directly connected to any port of the network device.

In general, in one aspect, the invention relates to a network device, comprising a port configured to receive a packet, a processor configured to receive the packet from an Ethernet switch interposed between the port and the processor, in response to receiving the packet, make a first determination that a trigger condition exists, and in response to the first determination, issue a configuration action, wherein the configuration action, when performed by the network device, modifies a configuration of a component on the network device, wherein the component is one selected from a group consisting of a packet processor and the Ethernet switch.

Other aspects of the invention will be apparent from the following description and the appended claims.

DETAILED DESCRIPTION

Figure 1:
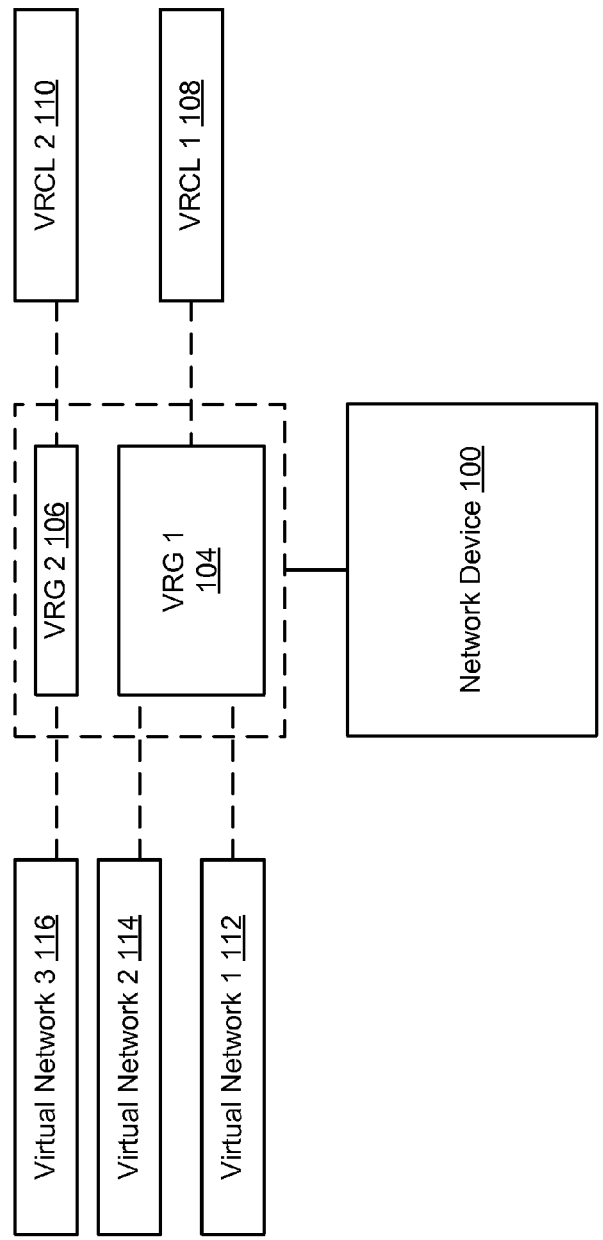
FIG. 1 shows a diagram relating the various components in a system in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-10, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a network device that includes functionality to processes packets. Further, in one or more embodiments of the invention, the network device includes functionality to dynamically modify the configuration of one or more components in the network device. In one embodiment of the invention, the network device uses virtual traffic shapers (VTSs) to monitor and manage the flow of packets in the network device.

In one or more embodiments of the invention, the network device is configured to implement macro-level policies and micro-level policies. In one embodiment of the invention, macro-level policies corresponds to policies that are set by the vCoherence controller with input from various components in the network device (see e.g., FIGS. 2C, 3A, and 7). In one embodiment of the invention, the micro-level policies relate to policies that are set by the VTSs executing on the packet processors (PPs) (see e.g., FIG. 2A, 2B, 5, 8-10).

The macro-level policies typically take longer to determine and implement as compared with the micro-level policies. For example, in order to implement a macro-level policy the vCoherence controller obtains input from various components in the network device, determines a macro-level policy, and communicates the macro-level policy to the various VTSs to implement. Once received, the VTSs implement the macro-level policies. In contrast, each VTS can determine micro-level policies based on information about the packets the VTS is processing. As such, there is less lag in determining and implementing the micro-level policies because the information used to determine the micro-level policy is being collected by the same entity (i.e., the VTS) that is determining the micro-level policy.

In one embodiment of the invention, implementing the macro-level policy may include modifying the manner in which one or more components processes packets received by the network device. Further, in one embodiment of the invention, implementing the micro-level policy may include modifying the manner in which one or more components processes packets received by the network device.

In one embodiment of the invention, a network device is any physical device that includes functionality to receive packets from one network entity and send packets to another network entity. The packets may be received directly from a network entity or received via a network interposed between the network entity and the network device. Further, the packets may be sent directly to a network entity or sent via a network interposed between the network device and the network entity. Examples of network devices include, but are not limited to, single-layer switches, multi-layer switches, and routers. Network entities correspond to any virtual or physical device on a network that is configured to receive packets and send packets. Examples of network entities include, but are not limited to, network devices (defined above), virtual machines, host operating systems natively executing on a physical device, virtual network appliances (e.g., virtual switch, virtual router), and physical network appliances (e.g., firewall appliance).

In one embodiment of the invention, a network corresponds to any wired or wireless network. Further, the network may also be implemented using both wired and wireless segments.

FIG. 1 shows a diagram relating the various components in the system in accordance with one or more embodiments of the invention. The system includes a network device (100), one or more virtualizable resource groups (VRGs) (e.g., 104, 106), one or more virtualizable resource control lists (VRCLs) (e.g., 108, 110), and one or more virtual networks (e.g., 112, 114, 116). Each of these components is described below.

In one embodiment of the invention, the network device (100) includes a switch fabric (not shown). The switch fabric may be implemented using packet switching, circuit switching, another type of switching, or any combination thereof. In one embodiment of the invention, the switch fabric is implemented using an Ethernet switch chip (also referred to as an Ethernet switch). The network device (100) may be implemented using any combination of hardware, firmware, and/or software. With respect to the hardware, the network device (100) may be implemented using any combination of general purpose hardware and/or special purpose hardware (e.g., Packet Processors (PPs), Field Programmable Gate Arrays (FPGAs), Application Specific Integrated Circuits (ASICs), etc.) and any type of storage and/or memory including, but not limited to, random access memory (RAM), dynamic random access memory (DRAM), static random access memory (SRAM), NAND-type flash memory, NOR-type flash memory, any other type of memory, any other type of storage, or any combination thereof. Additional details of the network device may be found in FIGS. 2A-2C.

In one embodiment of the invention, a VRG is a listing of network entities (defined above), flows (e.g., one or more transmission control protocol (TCP) flows, one or more user datagram protocol (UDP) flows, one or more internet control message protocol (ICMP) flows, etc.), and/or other VRGs (i.e., VRGs may be nested). Those skilled in the art will appreciate that a VRG may be implemented using any type of known data structure. The elements in the VRG (e.g., network entities, flows, other VRGs) may be identified using one or more of the following: a VRG name, a media access control (MAC) address, MAC ethertype (for non-IP packets), IP type (e.g., TCP, UDP, etc.), OSI layer 4 information related to TCP ports, IPSec security associations (SA), a virtual local area network (VLAN) tag, a 802.1Q VLAN tag, a 802.1Q-in-Q VLAN tag, and an internet protocol (IP) address. The elements associated with a given VRG may be identified using other means not included above without departing from the invention.

In one embodiment of the invention, a virtual network is a logical grouping of two or more network entities. In one embodiment of the invention, each VRG may be associated with one or more virtual networks. In one embodiment of the invention, the network entities may be associated with a virtual network and, in turn, the virtual network may be associated with the VRG. Once the virtual network is associated with a VRG, the network entities in the virtual network become elements of the VRG. In one embodiment of the invention, the VRG may only list the virtual network name as an element of the VRG instead of listing the individual network entities in the virtual network.

In one embodiment of the invention, each VRG is associated with a virtualizable resource control list (VRCL) (e.g., 108, 110). The VRCL is a data structure that specifies one or more of the following: (i) which network entities in the VRG can communicate with each other and with network entities in other VRGs and (ii) operational parameters for the VRG or sub-sets of elements therein. For example, the VRCL may specify one or more of the following: (i) which network entities in the VRG can communicate with each other; (ii) maximum latency for packets transmitted between network entities in the VRG; (iii) total bandwidth limits for the VRG; (iv) bandwidth limits for various network entities or flows in the VRG; (v) priority of the VRG relative to other VRGs in the network device; (vi) guaranteed bandwidth for the VRG; (vii) bandwidth guaranteed for various network entities or flows in the VRG; (viii) maximum queue length for virtual resource queues (VRQs) (defined below in FIGS. 3A-3B) associated with VRG; (ix) guarantees and/or limits on queues that the VRG may use; and (x) guarantees and/or limits on the analytics resources that the VRG may use. In one embodiment of the invention analytics resources may include, but are not limited to, (i) packet counters that may be used to count particular packets associated with the VRG, e.g., packets that are sent or received from a particular port, packets that have a particular size, packets that have a particular latency range, and/or packets that match a particular internal data pattern (e.g., TCP SYN/FIN packets, etc.); (ii) byte counters that count the number of bytes associated with particular characteristics, e.g., the number of bytes received at a particular port, the number of bytes sent from a particular port, a number of bytes corresponding to packets that have particular internal data pattern; and (iii) the bandwidth and storage capacity that may be used to store packets that are captured in order to obtain analytics for the VRG. Those skilled in the art will appreciate that the VRCL may specify other information not included above without departing from the invention.

Figure 2A:
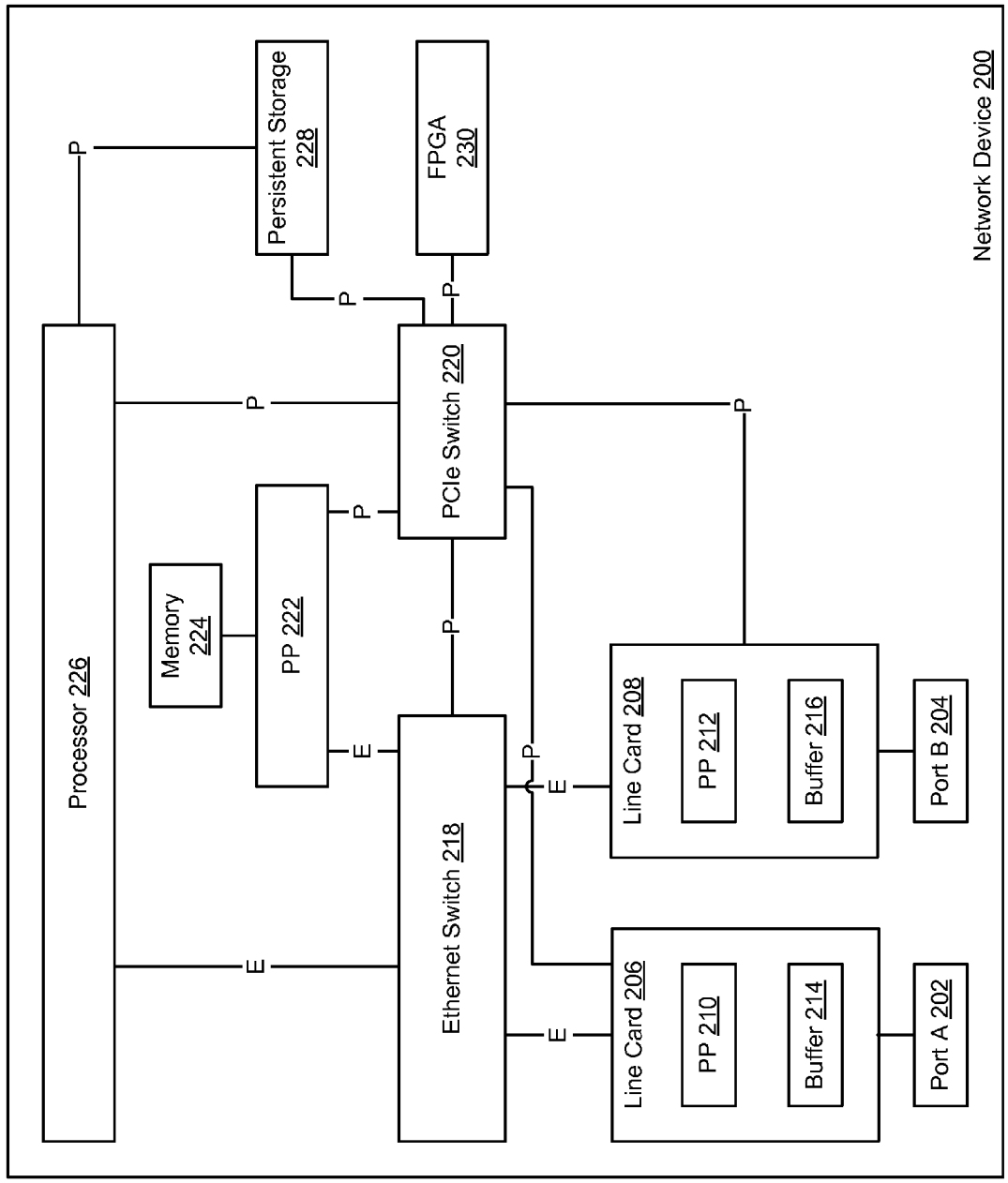
FIGS. 2A-2C show a network device in accordance with one or more embodiments of the invention.
Figure 2B:
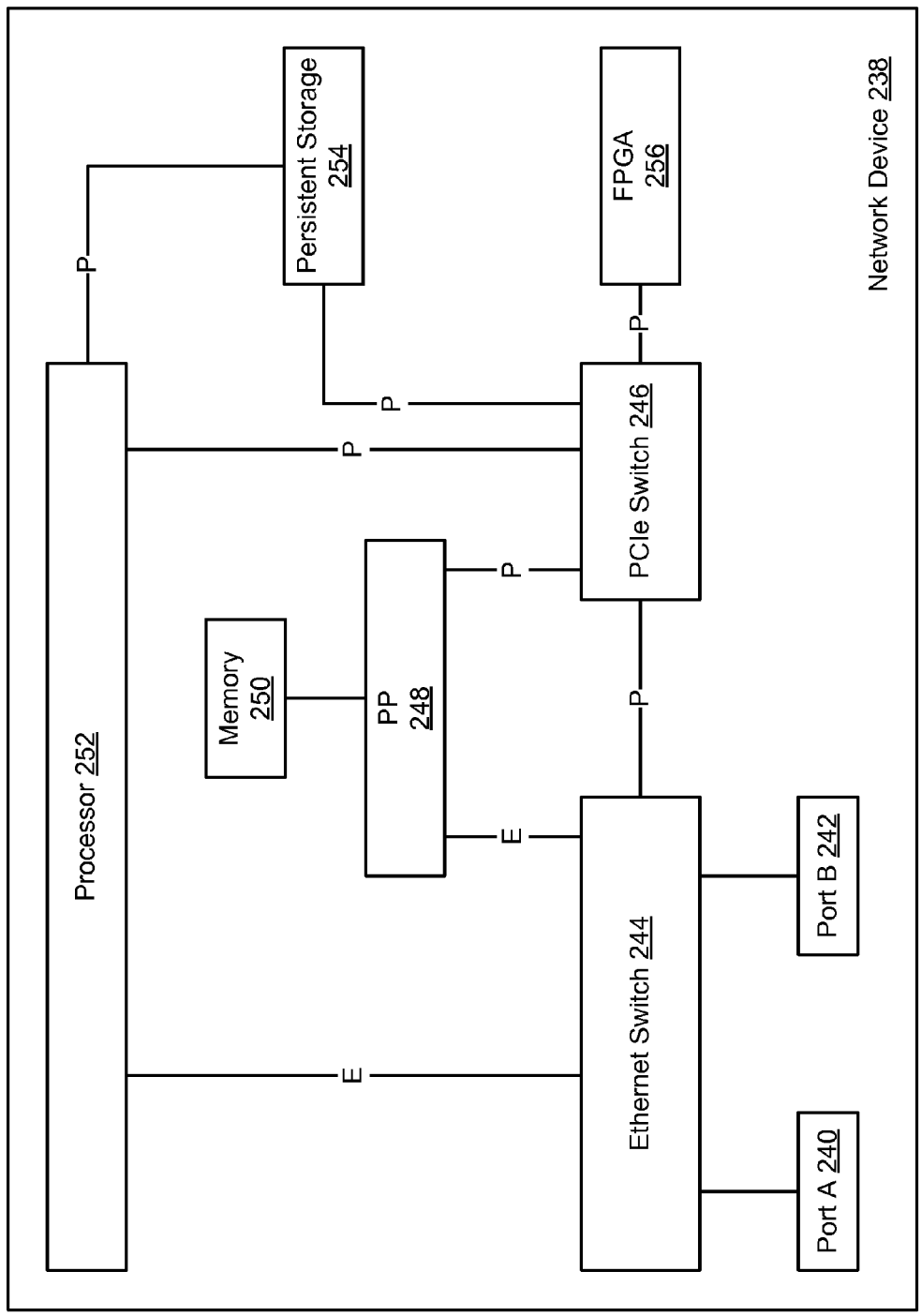
Figure 2C:
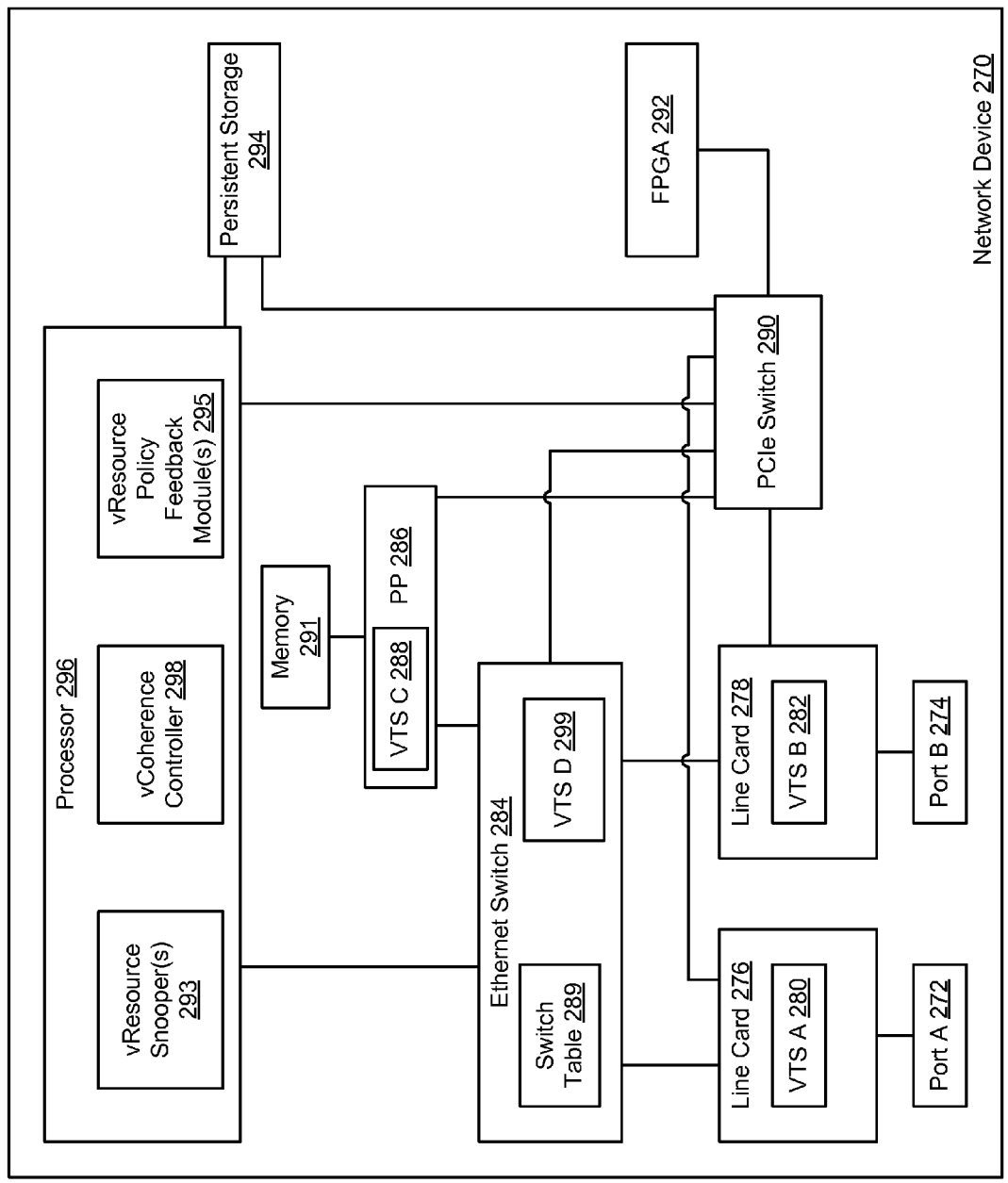

FIGS. 2A-2C show network devices in accordance with one or more embodiments of the invention.

Referring to FIG. 2A, the network device (200) includes ports (202, 204), line cards (206, 208), an Ethernet switch (218), a PCIe switch (220), an FPGA (230), persistent storage (228), a processor (226), memory (224), PPs (210, 212, 222), and buffers (214, 216). Each of these components is described below.

In one embodiment of the invention, the ports (202, 204) are hardware interfaces configured to receive packets from a network entity or a line card (206, 208). In addition, the ports are configured to send packets to a line card (206, 208) or to a network entity. In one embodiment of the invention, one or more a given port may be denoted as an egress port if packets are sent from the line card to the port.

In one embodiment of the invention, each line card (206, 208) includes a PP and a buffer (214, 216). In one embodiment of the invention, the PP (210, 212) is configured to process packets using one or more virtual traffic shaper (VTSs) executing thereon. (see e.g., FIGS. 2C, 5-7). Further, as part of processing packets the PP (210, 212) may temporarily store packets in a buffer (214, 216). The buffer may correspond to any storage medium that is capable of temporarily storing packets. The line card (206, 208) may send packets to the Ethernet switch (218) and receive packets from the Ethernet switch (218).

The line cards may receive configuration actions (see FIG. 5) from other PPs (210, 212). Further, the line cards may receive other configuration instructions from the processor (226) (see FIGS. 3A and 7), regardless of source of the configuration actions and/or configuration instructions. The line card, and, more specifically, the PP is configured to perform the configuration actions and/or configuration instructions.

In one embodiment of the invention, the Ethernet switch (218) is configured to receive packets from the line cards, the processor, and the PP (222) and send the packet to one of one or more line cards, the processor, and the PP (222). Further, the Ethernet switch is configured to receive configuration actions (see FIG. 5) from PPs (210, 212, 222). Further, the Ethernet switch may receive other configuration instructions from the processor (226) (see FIGS. 3A and 7). Regardless of the source of the configuration actions and/or configuration instructions the Ethernet switch is configured to perform the configuration actions and/or configuration instructions.

In one embodiment of the invention, the network device (200) includes a shared PP (222). The shared PP (222) includes same packet processing functionality as the PPs (210, 212) in the line cards. Further, the shared PP (222) may also issue configuration actions to other components in the network device (see FIG. 5). The shared PP (222) is able to temporarily store received packets in memory (224) operatively connected to the shard PP (222). The memory may correspond to any storage medium that is capable of temporarily storing packets. The shared PP (222) may receive packets from the line cards and/or from the processor. The Ethernet switch (218) may also be configured to send packets to the shared PP (222) for buffering when the Ethernet switch detects a certain level of congestion within the Ethernet switch in order to prevent packets from being dropped. In such scenarios, the Ethernet switch may also include functionality to stop sending packets to the PP when the level of congestion in the Ethernet switch drops below a threshold value. In one embodiment of the invention, a subset of packets in the Ethernet switch may be sent to the PP while the remaining packets are processed by the Ethernet switch. For example, packets that are exceeding their guaranteed bandwidth or are of a lower priority relative to other packets being processed by the Ethernet switch are transferred to the PP for temporary buffering. The offloading of the aforementioned packets allows the remaining packets in the Ethernet switch to be processed at their guaranteed bandwidth, latency, etc. even when there is potential congestion in the Ethernet switch. Said another way, if the Ethernet switch detects that congestion is occurring (or is likely to occur in the near further), the Ethernet switch may take steps to proactively relieve the congestion by offloading certain packets to the PP thereby preserving various guarantees (e.g., bandwidth, latency, etc.) for other packets being processed by the Ethernet switch.

In one embodiment of the invention, the Ethernet switch includes a VTS. The VTS implemented by the Ethernet switch may be same as the VTS implemented by the PPs. Alternatively, the Ethernet switch may implement a VTS that has less functionality than the VTSs implemented by the PPs. In such embodiments, the VTS implemented by the Ethernet switch may, e.g., only be able to implement limited packet classification, perform a limited number of actions on the packets, and/or implement a limited number of queues relative to the VTSs on the PP. In one embodiment of the invention, if the Ethernet switch implements a VTS with limited functionality, the VTS in the Ethernet switch may be used to shape traffic in order to determine which packets to send the PP (222) and which packets to process without the PP (222). This implementation may allow the Ethernet switch to perform coarse control over the packet flow and the PP (222) to perform fine control over a subset of the packets offloaded from the Ethernet switch.

In one embodiment of the invention, the processor (226) is configured to execute the vCoherence controller (298), the vResource Snooper(s) (293), and the vResource Policy Feedback Module (295) (see FIG. 2C). Further, the processor (226) is configured to issue configuration instructions resulting from executing of the vCoherence controller (298). The processor (226) is also configured to receive packets from other components in the system, analyze the received packets to obtain analytics information (e.g., latency, bandwidth usage, drop rates, etc.) and/or store the received packets in persistent storage (228) for processing at some later time. In one embodiment of the invention, the processor (226) and/or other components in the network device (e.g., PPs (210, 212, 222) may offload processing to an FPGA (230). In one embodiment of the invention, components other than the processor (226) may send packets to the persistent storage (228). In one embodiment of the invention, the processor may also include the same functionality as the PPs—namely—the ability to issue configuration actions in addition to issuing configuration instructions.

In one embodiment of the invention, the various components in the network device (200) are connected via Ethernet (denoted with an "E") and/or via Peripheral Component Interconnect (PCI) (denoted with a "P"). In one embodiment of the invention, packets are generally communicated between various components in the network device using Ethernet and configuration actions and/or instructions that are generally communicated using PCI. In one embodiment of the invention, the PCIe switch (220) is configured to manage PCI communication within the network device. Those skilled in the art will appreciate that the invention is not limited to the aforementioned protocols.

Referring to FIG. 2B, FIG. 2B shows a network device in accordance with one or more embodiments of the invention. Referring to FIG. 2B, the network device (238) includes ports (240, 242), an Ethernet switch (244), a PCIe switch (246), an FPGA (256), persistent storage (254), a processor (252), memory (250), and a shared PP (248). Each of these components is described below.

In one embodiment of the invention, the ports (240, 242) are hardware interfaces configured to receive packets from a network entity or an Ethernet switch (244). In addition, the ports are configured to send packets to an Ethernet switch (244) or to a network entity.

In one embodiment of the invention, the Ethernet switch (244) is configured to receive packets from the processor and the shared PP (248) and send the packet to the processor and the shared PP (248). Further, the Ethernet switch is configured to receive configuration actions (see FIG. 5) from the shared PP (248). Further, the Ethernet switch may receive other configuration instructions from the processor (226) (see FIGS. 3A and 7). Regardless of the source of the configuration actions and/or configuration instructions the Ethernet switch is configured to perform the configuration actions and/or configuration instructions.

In one embodiment of the invention, the shared PP (248) includes the same packet processing functionality as the PPs (210, 212) described in FIG. 2A. Further, the shared PP (248) may also issue configuration actions to other components in the network device (see FIG. 5). The shared PP (248) is able to temporarily store received packets in memory (250) operatively connected to the shared PP (248). The memory may correspond to any storage medium that is capable of temporarily storing packets. The shared PP (248) may receive packets from the processor. The Ethernet switch (244) includes the same functionality as the Ethernet switch described in FIG. 2A.

In one embodiment of the invention, the processor (252) is configured to execute the vCoherence controller (298), the vResource Snooper(s) (293), and the vResource Policy Feedback Module (295) (see FIG. 2C). Further, the processor (252) is configured to issue configuration instructions resulting from executing of the vCoherence controller (298). The processor (252) is also configured to receive packets from other components in the system, analyze the received packets to obtain analytics information (e.g., latency, bandwidth usage, drop rates, etc.) and/or store the received packets in persistent storage (254) for processing at some later time. In one embodiment of the invention, the processor (252) and/or other components in the network device (e.g., shared PP (222) may offload processing to an FPGA (256)). In one embodiment of the invention, components other than the processor (252) may send packets to the persistent storage (254).

In one embodiment of the invention, the various components in the network device (238) are connected via Ethernet (denoted with an "E") and/or via Peripheral Component Interconnect (PCI) (denoted with a "P"). In one embodiment of the invention, packets are generally communicated between various components in the network device using Ethernet and configuration actions and/or instructions are generally communicated using PCI. In one embodiment of the invention, the PCIe switch (246) is configured to manage PCI communication within the network device. Those skilled in the art will appreciate that the invention is not limited to the aforementioned protocols.

Referring to FIG. 2C, as discussed above, the network device (270) executes various virtual traffic shapers (VTSs) (280, 282, 288, 299) as well as vResource snooper(s) (293), vCoherency controller (298), and vResource Policy Feedback module(s) (295). FIG. 2C shows the location of the aforementioned components in the network device.

More specifically, the network device (270) includes ports (272, 274), line cards (276, 278), an Ethernet switch (284), a PCIe switch (290), an FPGA (292), persistent storage (294), a processor (296), and memory (291). For purposes of clarity in FIG. 2C, various other components in the network device (270) have been omitted from FIG. 2C, e.g., PPs in line card and buffers. The aforementioned components operate as described above with respect to FIG. 2A.

Continuing with the discussion of FIG. 2C, each VTS (280, 282, 288) is configured to process the packets received from a port (272, 274) and, if appropriate, send the packets to the Ethernet switch. Depending on the implementation, one or more VTSs may be used to process packets received from the Ethernet switch without departing from the invention. In one embodiment of the invention, the Ethernet switch may also implement a VTS (299) (as described above with respect to FIG. 2A).

Each VTS processes the packets based on operating parameters set by the vCoherence Controller (VCC) (298). In one embodiment of the invention, the operating parameters may be determined based on one or more of the VRCLs.

The operating parameters may include, but are not limited to, virtual resource queue (VRQ) length, drain rate of VRQ (referred to as "drain rate"), cut-through policies, and VRQ scheduling policies. In one embodiment of the invention, the VRQ length corresponds to a maximum number of packets that may be queued in the VRQ at any one time. In one embodiment of the invention, the drain rate corresponds to the rate at which packets queued in a given VRQ are removed from the VRQ and scheduled for transmission. The drain rate may be measured as data units/unit time, e.g., megabits/second. The drain rate may also be measured as packets/second. In one embodiment of the invention, cut-through policies correspond to policies used to determine whether a given packet should be temporarily stored in a VRQ or if the packet should be sent directly to a VRQ drainer (see FIG. 3A). In one embodiment of the invention, VRQ scheduling policies correspond to policies used to determine the order in which VRQs in a given VTS are processed.

Returning to FIG. 2C, the VCC (298) obtains statistics from the vResource Snooper(s) (VRS) (293) and uses the statistics to update and/or modify, as necessary, the operating parameters for one or more VTSs. In one embodiment of the invention, the VCC (298) may obtain statistics directly from the individual VTSs. Those skilled in the art will appreciate that other mechanisms may be used to obtain the statistics from the VTS by the VCC without departing from the invention.

Continuing with the discussion of FIG. 2C, in one embodiment of the invention, the VCC (298) includes functionality to obtain statistics from the VRS (293) and then to change the drain rates (described below) for one or more VRQ drainers (310 in FIG. 3A) based on the statistics obtained from all (or a portion) of the VTSs. The VCC (298) may also provide particular statistics to the VTS or components within the VTS, e.g., the VRCL enqueuer (304 in FIG. 3A) and VRQ Drainer (310 in FIG. 3A), in order for the VTS (or components therein) to perform their functions. Additional details of the operation of the VCC (298) are described in FIG. 7 below. Returning to FIG. 2C, the VRS (293) is configured to obtain statistics from the individual VTSs. The statistics may include, but are not limited to: (i) packets received by the VTS, (ii) packets dropped by the VRG classifier (see FIG. 3A), (iii) packets dropped by the VRCL enqueuer (see FIG. 3A), (iv) packets queued by each VRQ in the VTS, (v) number of cut-through packets, (vi) queue length of each VRQ in the VTS, (vi) number of packets scheduled for transmission by the VRQ drainer (see FIG. 3A), and (vii) latency of VTS. The statistics may be sent to the VRS (293) as they are obtained or may be sent to the VRS (293) at various intervals. Further, the statistics may be aggregated and/or compressed within the VTS prior to being sent to the VRS (293).

Any updates or modifications to the operating parameters of the one or more VTSs are sent to the vResource Policy Feedback Module (RPFM) (295). The RPFM (295) communicates the updates and/or modifications of the operating parameters to the appropriate VTSs. In one embodiment of the invention, the updates and/or modifications to the operating parameters are communicated to the VTSs as configuration instructions. Upon receipt, the VTSs implement the updated and/or modified operating parameters. In another embodiment of the invention, any updates or modifications to the operating parameters of the one or more VTSs are sent directly to the VTSs from the VCC.

In one embodiment of the invention, the Ethernet switch includes a switch table (289). The switch table is used by the Ethernet switch to direct packets to the appropriate component on the network device.

Those skilled in the art will appreciate that while FIGS. 2A-2C show various network device configurations, the invention is not limited to the aforementioned network device configurations. Further, those skilled in the art will appreciate that embodiments of the invention may be implemented in which some ports in the network device are attached to a line card while other ports in the network device do not include a line card (i.e., the ports are directly connected to the Ethernet switch).

Figure 3A:
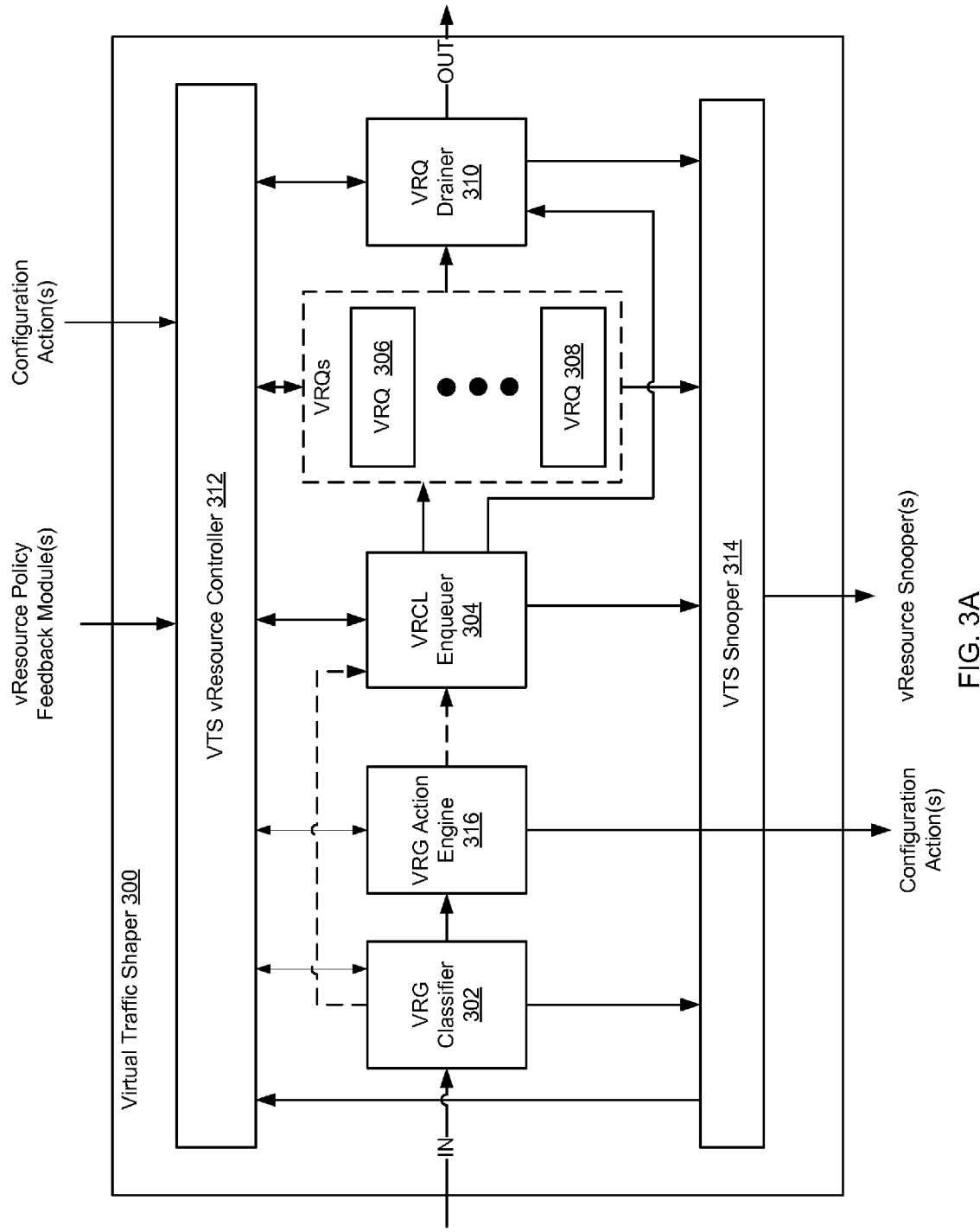
FIG. 3A show a virtual traffic shaper in accordance with one or more embodiments of the invention.
Figure 3B:
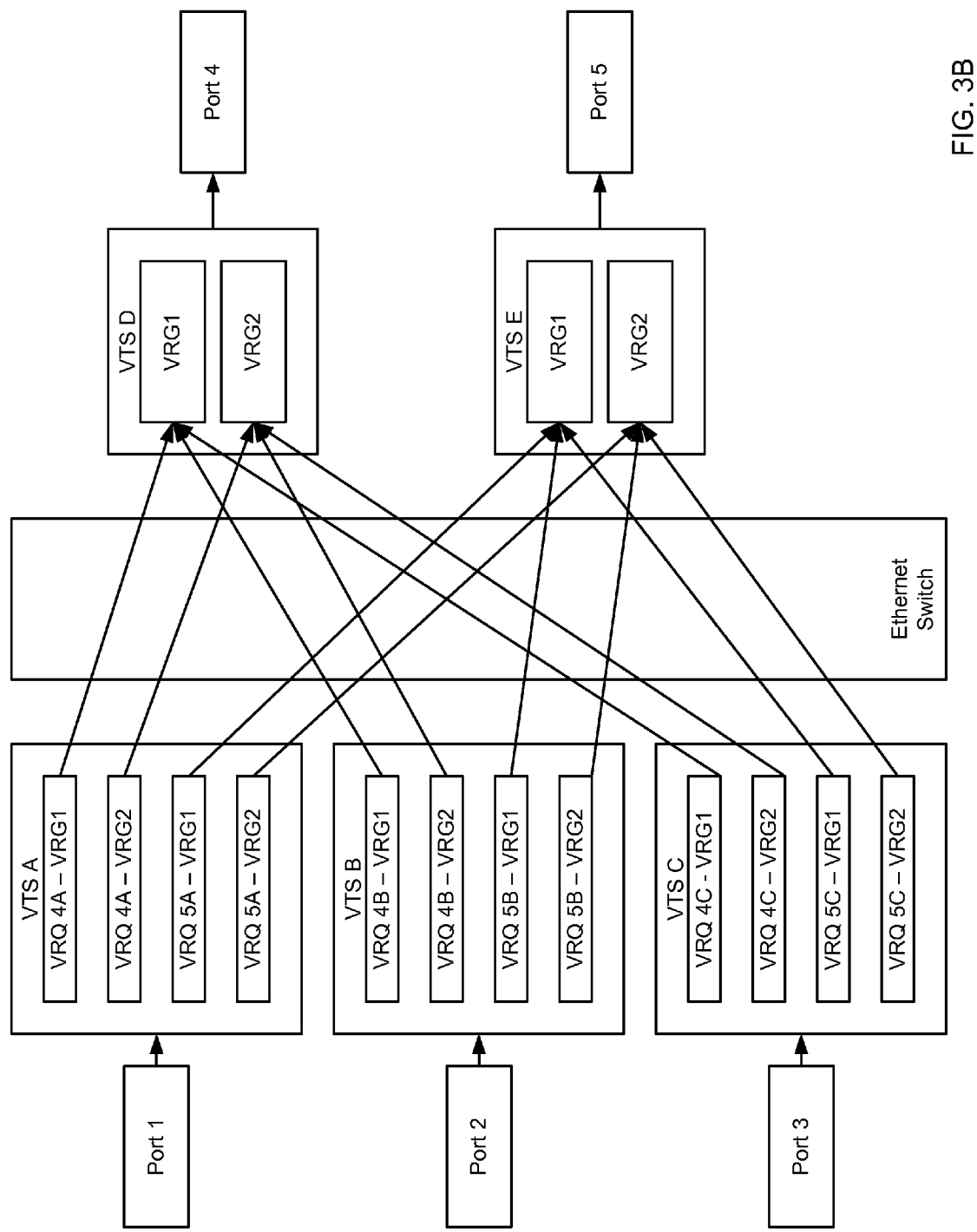
FIG. 3B shows an example in accordance with one or more embodiments of the invention.

FIGS. 3A-3B show virtual traffic shapers (VTSs) in accordance with one or more embodiments of the invention. FIG. 3A shows a virtual traffic shaper (VTS) (300) in accordance with one or more embodiments of the invention. The VTS includes a VRG classifier (302), a VRG Action Engine (316), a VRCL enqueuer (304), one or more VRQs (e.g., 306, 308), a VRQ drainer (310), a VTS VRC (312) and a VTS Snooper (314). Each of these components is described below.

In one embodiment of the invention, the VRG classifier includes one or more classification tables (not shown). The classification tables include: (i) mappings between packet header information (or portions thereof) (e.g., OSI layer 2-OSI layer 7) and VRGs; and (ii) mappings between packet header information (or portions thereof) and egress physical port(s) (EPP) (i.e., the physical port of the egress side of the Ethernet switch—e.g., output port 4 in FIG. 3B). Alternatively, or in addition to the above, the classification tables may also include: (i) mappings between meta-packet data such as timestamps, ingress physical port, or any portion of a packets path, and the VRG and (ii) mappings between meta-packet data such as timestamps, ingress physical port, or any portion of a packets path, and the egress physical port(s). The VRG classifier is configured to use the aforementioned classification table(s) to determine the VRG associated with the packet and the EPP for the packet. In one embodiment of the invention, the destination MAC address is used to determine both the VRG and the EPP.

In one embodiment of the invention, the VRG action engine (316) is configured to determine whether there is a rule that matches the VRG-EPP pair as determined by the VRG classifier (302). More specifically, the VRG action engine (316) is configured to determine whether there is a rule associated with the VRG-EPP pair. If there is a rule, the VRG action engine (316) is configured to obtain an action(s) associated with the rule and to perform the action(s). Alternatively, if no rule exists then the VRG action engine (316) is configured to perform a default action.

In one embodiment of the invention, a rule exists for the VRG-EPP pair if (i) a packet with the same VRG-EPP pair was previously received and, at that time, a rule was created for the VRG-EPP pair or (ii) prior to receiving any packets for the VRG-EPP pair, a rule for the VRG-EPP pair was created—e.g., by the network administrator or in response to configuration instruction or configuration action.

In one embodiment of the invention, there is a rule associated with the VRG-EPP pair if there is an entry data structure maintained and/or accessible by the VRG action engine. In such cases, VRG-EPP (or a value derived from the VRG-EPP) is used perform a lookup in a data structure. If there is a hit in the lookup, then one or more rule-specific actions are obtained by the VRG action engine. Alternatively, if there is no hit, then the VRG action engine may perform a default action.

In one embodiment of the invention the rule-specific actions may include, but are not limited to, (i) dropping the packet, (ii) attempting to enqueue the packet (see FIG. 6A), (iii) creating a copy of the packet and sending the copy of the packet to the processor or the shared PP, (iv) creating a copy of the copy packet and sending the packet to the persistent storage, (v) rewriting at least a portion of the header information in the packet, (vi) temporarily storing the packet in a buffer or memory while awaiting a response from another component in the network device about if and where to send the packet, (vii) counting packets and/or bytes, e.g., as described above with respect to FIG. 2A, (viii) adding one or more headers to the packet, e.g., to tag the packet in order to simplify later classification, to affect later routing or switch, to help measure latency, to improve switching latency, and/or to affect later classification of the packet; and (ix) removing one or more headers from the packets. Other rule-specific actions may be implemented without departing from the invention. In one embodiment of the invention, multiple actions may be performed on a single packet without departing from the invention.

In one embodiment of the invention, the rule specific-action may be a conditional action. For example, the rule-specific action may only be performed if header information in the packet satisfies another condition such as the IP address equals a particular value, the packet is of a particular type, or the packet is associated with a particular TCP stream.

In one embodiment of the invention, the default action may include sending the packet to the Ethernet switch to the process using, e.g., "best effort", and sending a copy of the packet to the VCC (298) in order for VCC (298) to determine a rule-specific action for the packet. Once the rule-specific action is determined, the VTS (which received the packet) is updated with a rule (defined by the VRG-EPP pair for the packet) along with the rule-specific action. All subsequent packets that match the new rule are processed using the rule-specific action.

In another embodiment of the invention, the default action may include sending the packet to the VCC (298) in order for the VCC (298) to determine a rule-specific action for the packet. Once the rule-specific action is determined, the VTS (which received the packet) is updated with a rule (defined by the VRG-EPP pair for the packet) along with the rule-specific action and the packet is sent back to the VTS and processed using the rule-specific action.

In another embodiment of the invention, the default action may include storing the packet in the buffer (or memory) and sending a copy of the packet to the VCC (298) in order for the VCC (298) to determine a rule-specific action for the packet. Once the rule-specific action is determined, the VTS (which received the packet) is updated with a rule (defined by the VRG-EPP pair for the packet) along with the rule-specific action. The previously buffered packet is subsequently processed using the rule-specific action.

In one embodiment of the invention, the VRG action engine is also configured to generate configuration actions. As discussed above, the configuration actions are used to implement micro-level policies determined by the PP (or more specifically, the VTS executing on the PP). The VRG engine may trigger a configuration action based on whether a trigger condition exists.

Examples of trigger conditions include, but are not limited to, (i) the VTS has received a set of packets where the set of packets matches a pattern; (ii) the VTS has detected a receipt of packets of a specific type; (iii) VTS has detected a particular operating condition in the network device using statistics gathered by the network device.

In one embodiment of the invention, the pattern may be based on one or more of the following: (i) certain types of packets received in a certain order, (ii) certain types of packets received during a certain time, or (iii) certain packets are received in a certain order during a specific time.

In one embodiment of the invention, a configuration action may include, but is not limited to, (i) modifying the manner in which the Ethernet switch processes packets, (ii) modifying the manner in which one or more PPs in the network device processes packets, e.g., creating and/or modifying a rule-specific action, and (iii) notifying other components in the network device about the presence of particular packets and sending such packets to the other components in response to a request for such packets.

In one embodiment of the invention, the configuration actions may be the temporal in nature. Specifically, the configurations actions may only modify the configuration of a component in the network device for a specific period of time—after which the configuration of the component reverts back to the prior configuration.

Continuing with the discussion of FIG. 3A, in one embodiment of the invention, the VRCL enqueuer (304) is configured to receive packets from the VRG classifier and/or the VRG action engine along with the information about VRG and EPP. Depending on the implementation of the VTS, the VTS may attempt to queue all packets that match a rule. Such enqueuing may be performed in parallel with any configuration actions. Alternatively, the VRG action engine may process the packet and determine whether or not to attempt to enqueue the packet.

Continuing with FIG. 3A, if the packet is to enqueue, the VRCL enqueuer obtains the VRCL associated with the VRG. The VRCL enqueuer, using the VRCL and the EPP, determines whether to drop the packet, queue the packet in the appropriate VRQ, or designate the packet as a cut-through packet, thereby sending the packet directly to the VRQ drainer (310).

In one embodiment of the invention, the VTS includes one or more VRQs (e.g., 306, 308). In one embodiment of the invention, each VRQ is associated with a unique buffer. In another embodiment of the invention, the VRQs all share a common buffer, with each VRQ using only a specified portion of the buffer. Each VRQ is associated with a unique VRG-EPP pair. In one embodiment of the invention, each VTS includes a VRQ for each VRG-EPP pair combination that is possible for the network device. In another embodiment of the invention, one or more VRQs are dynamically created when they are initially required to store packets (e.g., when the first packet for a given VRG-EPP pair is received by the VTS). In another embodiment of the invention certain VRQs are created when the VTS is created while other VRQs are dynamically created while the VTS is executing. Further, one or more VRQs may be deallocated if no packets for a given VRG-EPP pair are received for a pre-determined period of time.

Continuing with FIG. 3A, in one embodiment of the invention, the VRQ drainer (310) is configured to obtain packets from the VRQs based on operating parameters set by the VCC (298). Once the VRQ drainer determines that a given packet is to be processed, the VRQ drainer obtains a packet from a VRQ and schedules the packet for transmission to a network, a network entity, or to a switch fabric. In one embodiment of the invention, scheduling a packet for transmission corresponds to initiating the process of transmitting the packet, e.g., performing any steps required to prepare the packet for transmission based on the protocol to be used to transmit the packet. The scheduling occurs after a packet has been selected for transmission but prior to the packet actually being transmitted. Once the packet is scheduled it is typically transmitted in due course.

In one embodiment of the invention, the VTS snooper (314) is configured to collect statistics (discussed above) for the particular VTS. The VTS snooper may send the raw data corresponding to the statistics to the VRS (293 in FIG. 2C) or, alternatively, may process the raw data (aggregate, compress, etc.) and then send the processed data to the VRS. In one embodiment of the invention, the VTS VRC (312) is configured to receive updated and/or modified operating parameters for the VTS from the RPFM (295 in FIG. 2C). In one embodiment of the invention, the VRC (312) may also be configured to receive configuration actions from other VTS (which are executing on PPs) in the network device.

FIG. 3B shows an example of VRQs in accordance with one or more embodiments of the invention. For the purposes of this example, assume that there are two VRGs associated with the network device. Further, for purposes of this example, various features are omitted in FIG. 3B to aid in the illustration of certain aspects of the invention.

Referring to FIG. 3B, the network device includes three input ports (also referred to as ingress ports) (i.e., port 1, port 2, port 3) and two output ports (also referred to as egress ports or egress physical ports) (i.e., port 4, port 5). Each ingress port includes a dedicated VTS, i.e., VTS A is dedicated to port 1, VTS B is dedicated to port 2, and VTS C is dedicated to port 3. In each VTS, there is a unique VRQ-output port (OP) pair for each VRG-OP combination. Accordingly, VTS A includes the following VRQs, namely, one for each VRG-OP pair: (i) VRQ 4A-VRG1, (ii) VRQ 4A-VRG2, (iii) VRQ 5A-VRG1, and VRQ 5A-VRG2. Similarly, VTS B includes the following VRQs: (i) VRQ 4B-VRG1, (ii) VRQ 4B-VRG2, (iii) VRQ 5B-VRG1, and VRQ 5B-VRG2. Finally, VTS C includes the following VRQs: (i) VRQ 4C-VRG1, (ii) VRQ 4C-VRG2, (iii) VRQ 5C-VRG1, and VRQ 5C-VRG2.

On the egress side of the switch fabric, VTS D and VTS E are configured to receive packets from the switch fabric that originated on the ingress side of the switch fabric. More specifically, VTS D is configured to receive all packets (regardless of which VRG a given packet is associated) for port 4 and VTS E is configured to receive all packets for port 5. With respect to VTS D, VTS D includes two VRQs—one for each VRG. Accordingly, packets from VRQ 4A-VRG1, VRQ 4B-VRG1, and VRQ 4C-VRG1 are stored in the VRQ corresponding to VRG1 in VTS D. Further, packets from VRQ 4A-VRG2, VRQ 4B-VRG2, and VRQ 4C-VRG2 are stored in the VRQ corresponding to VRG2 in VTS D.

Similarly, VTS E includes two VRQs—one for each VRG. Accordingly, packets from VRQ 5A-VRG1, VRQ 5B-VRG1, and VRQ 5C-VRG1 are stored in the VRQ corresponding to VRG1 in VTS E. Further, packets from VRQ 5A-VRG2, VRQ 5B-VRG2, and VRQ 5C-VRG2 are stored in the VRQ corresponding to VRG2 in VTS E. In another embodiment of the invention, VTS D and VTS E may be omitted such that VTS A, B, and C would send packets to port 4 or port 5 without any VTSs interposed between the Ethernet switch and the egress ports.

FIGS. 4-7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 4:
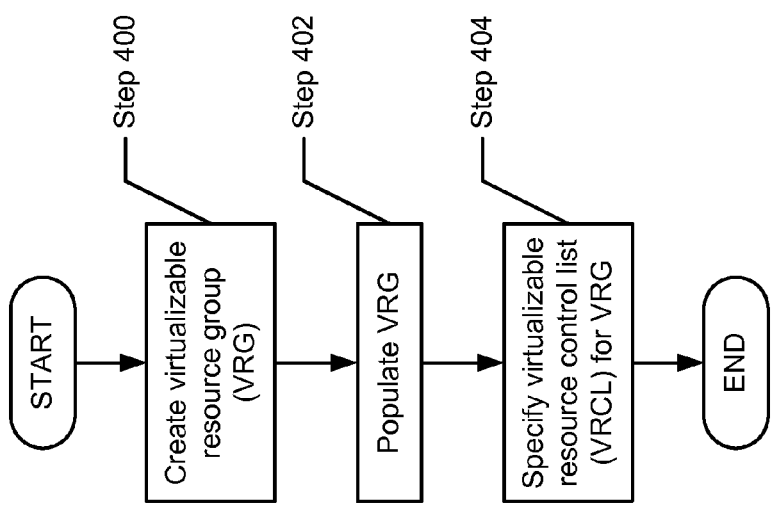
FIGS. 4-7 show flowcharts in accordance with one or more embodiments of the invention.

FIG. 4 shows a flowchart in accordance with one embodiment of the invention. More specifically, FIG. 4 shows a flowchart for creating and populating a VRG and VRCL in accordance with one or more embodiments of the invention. In Step 400, a VRG is created. In one embodiment of the invention, creating a VRG includes creating a VRG data structure, where the VRG data structure is assigned an identifier (e.g., a name) and is initially not populated with any network entities. In Step 402, the VRG is populated. In one embodiment of the invention, the VRG is populated with identifiers of network entities, flows, and/or other VRGs. Further, as discussed above, the network entities may be associated with a virtual network, where the virtual network is added to the VRG (as opposed to adding the individual network entities of the virtual network individually). In Step 404, a VRCL is associated with the VRG. At this stage, the network device (or components therein) may use the above information to monitor and manage the flow of packets between elements in the VRG. The VRCL may be populated prior to being associated with the VRG or the VRCL may be populated after being associated with the VRG.

Figure 5:
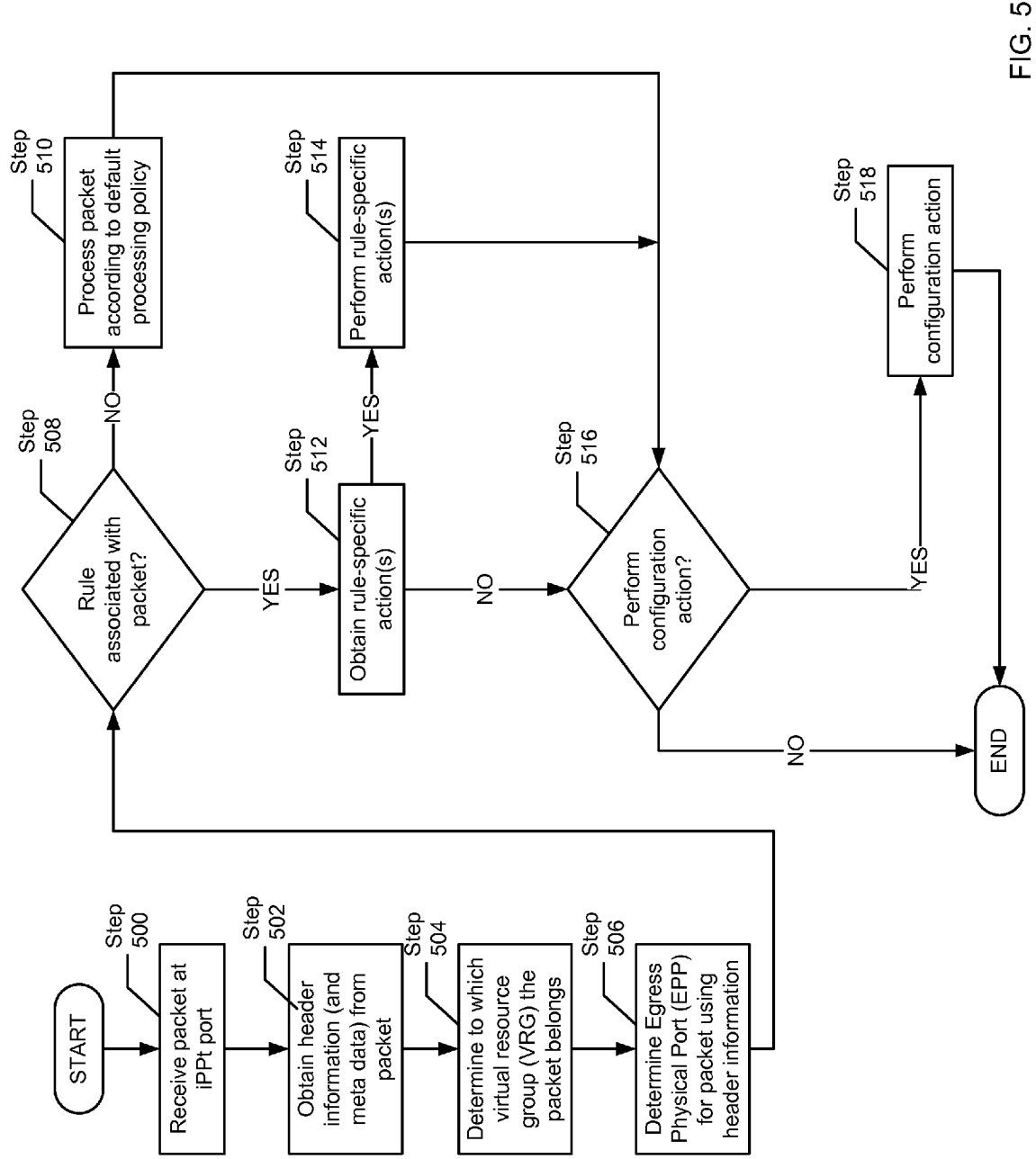

FIG. 5 shows a flowchart in accordance with one embodiment of the invention. More specifically, FIG. 5 shows a method for processing packets received by a VTS in accordance with one or more embodiments of the invention. In Step 500, a packet is received at an input port for the network device. The packet is then forwarded to the appropriate PP VTS (e.g., in FIG. 3B packets received by port 1 are forwarded to VTS A). In Step 502, the header information and/or meta-packet data is obtained from the packet. In one embodiment of the invention, step 502 is performed by a VRG classifier.

In Step 504, the VRG associated with the packet is determined using the header information obtained in Step 502. In one embodiment of the invention, Step 502 is performed by a VRG classifier. In Step 506, the egress physical port (EPP) (e.g., port 4 in FIG. 3B) is determined using the header information. In one embodiment of the invention, step 506 is performed by a VRG classifier.

In Step 508, a determination is made about whether the packet is associated with a rule. In one embodiment of the invention, a look-up is performed using the VRG-EPP information obtained in the prior steps. If there is a hit for the VRG-EPP pair—namely, a corresponding entry in data structure, then the process proceeds to Step 512. Alternatively, if there is no hit then the process proceeds to Step 510.

In Step 510, a default action is performed. The process then proceeds to Step 516. In step 512, the rule-specific action(s) associated with the rule are obtained. In step 514, the rule specific actions are performed. The process then proceeds to Step 516. In step 516, a determination is made about whether a trigger condition exists. If a trigger condition exists, then the process proceeds to step 518; otherwise the process ends. In Step 518, an appropriate configuration action is performed. In one embodiment of the invention, the configuration performed in Step 518 corresponds to a micro-level policy as described above.

Figure 6A:
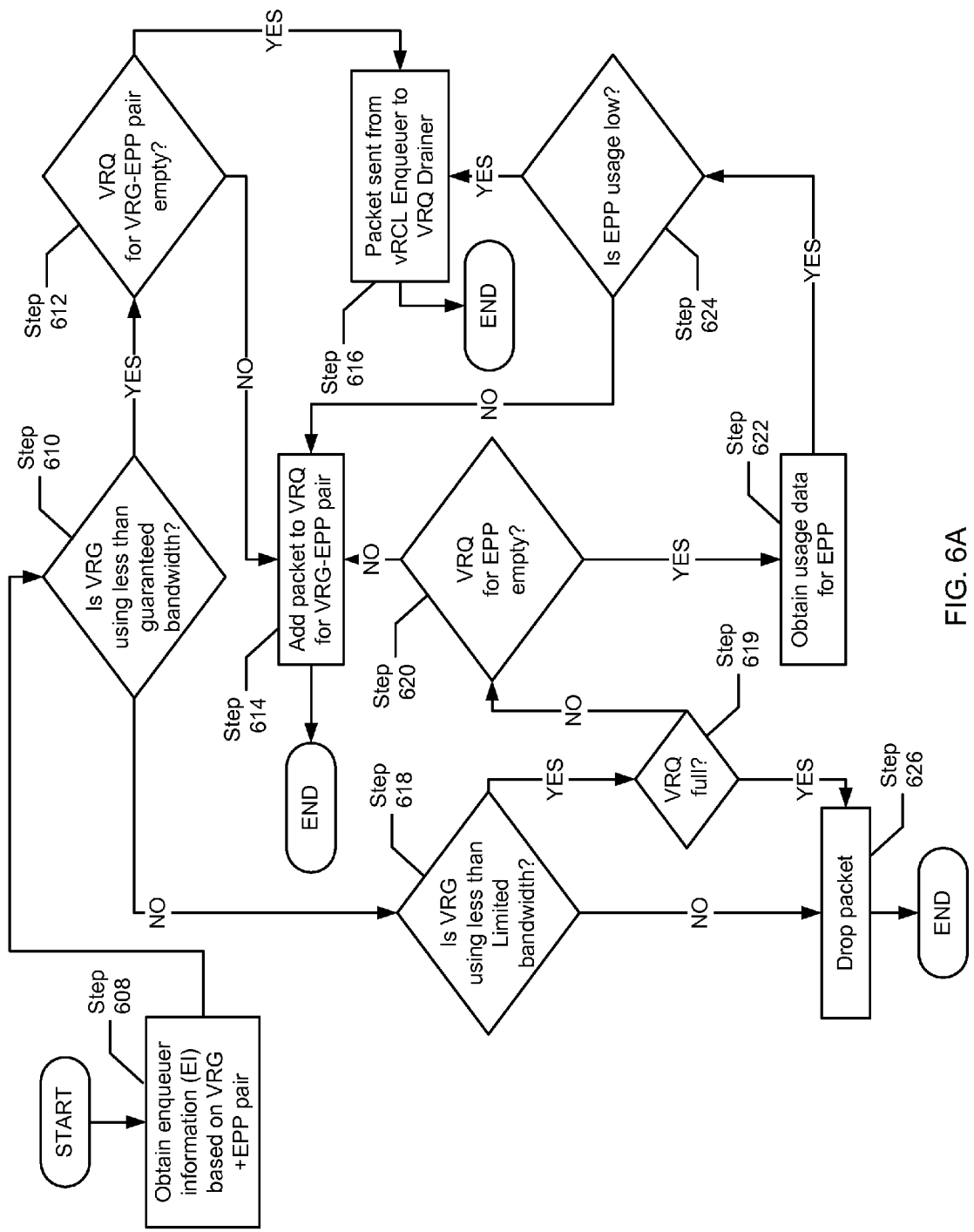
Figure 6B:
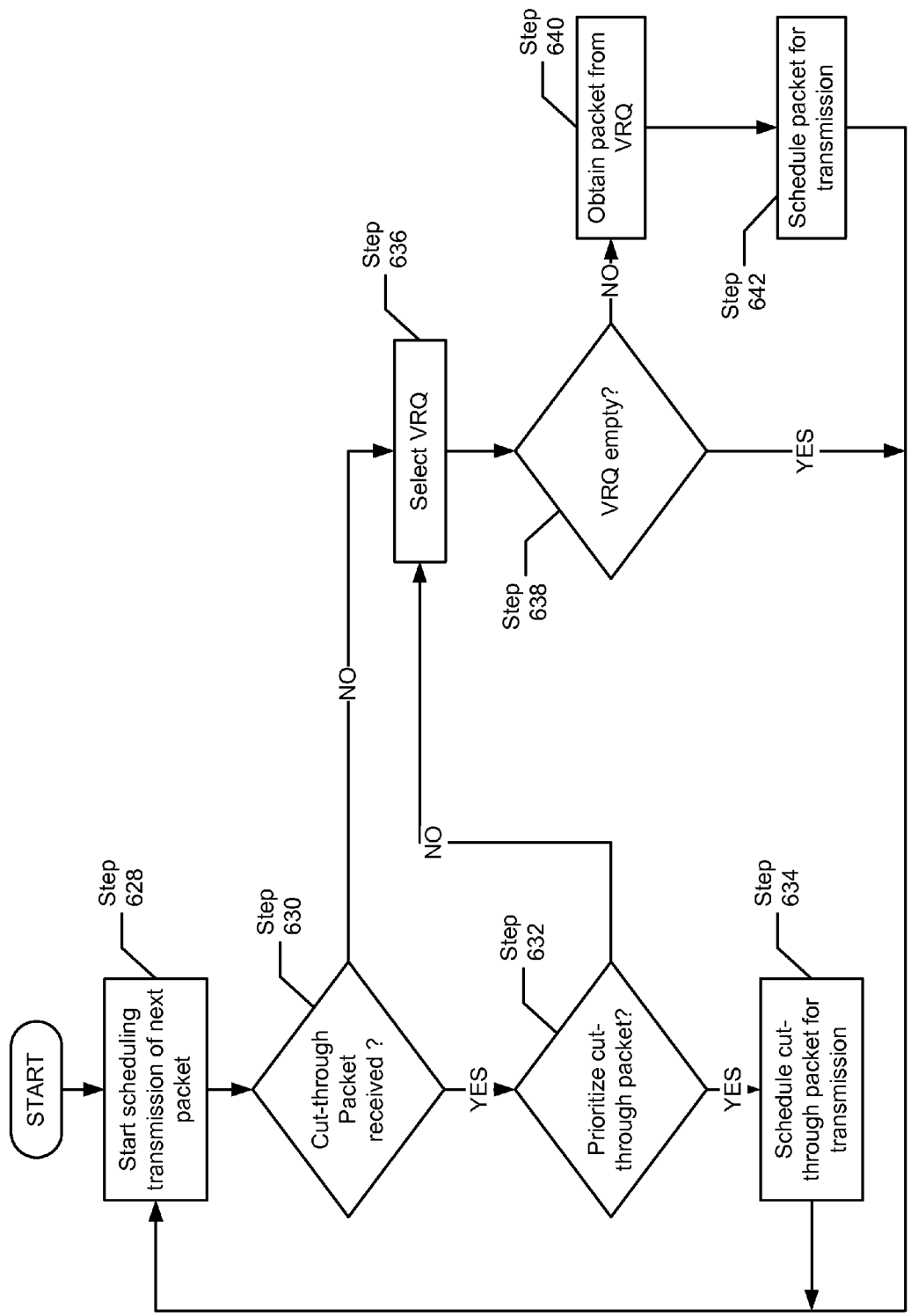

As discussed above, one of the rule-specific actions that may be performed on a packet is enqueing the packet. FIG. 6A shows a method for enqueuing a packet and FIG. 6B shows a method for processing queued packets in accordance with one or more embodiments of the invention.

Referring to FIG. 6A, in Step 608 the enqueuer information (EI) is obtained using the VRG and the EPP information obtained in Steps 504 and 506, respectively. In one embodiment of the invention, the EI includes, but is not limited to, the VRCL associated with the VRG and the statistics associated with the VRG. In one embodiment of the invention, Step 608 is performed by a VRCL enqueuer.

In Step 610, a determination is made about whether the VRG (identified in Step 504) is using less than its guaranteed bandwidth. In one embodiment of the invention, the guaranteed bandwidth for the VRG is determined using the VRCL (obtained in Step 608) and the current bandwidth usage of the VRG is determined using statistics (obtained in Step 608). In one embodiment of the invention, the guaranteed bandwidth for the VRG corresponds to the minimum bandwidth that the VRG is guaranteed. Alternatively (or in addition to a guaranteed bandwidth for the entire VRG), the VRCL may specify a guaranteed bandwidth for a particular pair of network entities, for a flow, and/or between a network entity and another VRG specified in the VRG. In such cases, Step 610 does not use the global guaranteed bandwidth and instead uses the more granular guaranteed bandwidth specified in the VRCL. If the VRG is using less than its guaranteed bandwidth, then the process proceeds to Step 612; otherwise the process proceeds to Step 618.

In Step 612, a determination is made about whether the VRQ for the VRG-EPP pair is empty. If the VRQ for the VRG-EPP pair is empty, the process proceeds to Step 616; otherwise the process proceeds to Step 614. In Step 614, the packet is added to the VRQ for the VRG-EPP pair. Those skilled in the art will appreciate that if the VRQ for the VRG-EPP pair does not exist prior to step 614, the VRQ is created prior to storing the packet. Further, those skilled in the art will appreciate that the packet may only be stored in the VRQ if there is sufficient space in the VRQ. Accordingly, if there is not sufficient space in the VRQ then the packet may be dropped.

Continuing with FIG. 6A, in Step 616, the packet is designated as a cut-through packet and is sent directly to the VRQ drainer in the VTS. In Step 618, a determination is made about whether the VRG (identified in Step 504) is using less than its limited bandwidth. In one embodiment of the invention, the limited bandwidth for the VRG is determined using the VRCL (obtained in Step 608) and the current bandwidth usage of the VRG is determined using statistics (obtained in Step 608). In one embodiment of the invention, the limited bandwidth for the VRG corresponds to the maximum bandwidth that the VRG can use. Alternatively (or in addition to a limited bandwidth for entire VRG), the VRCL may specify a limited bandwidth for a particular pair of network entities, for a flow, and/or between a network entity and another VRG specified in the VRG. In such cases, Step 618 does not use the global limited bandwidth and instead uses the more granular limited bandwidth specified in the VRCL. The limited bandwidth is greater than or equal to the guaranteed bandwidth. If the VRG is using less than its limited bandwidth, then the process proceeds to Step 619; otherwise the process proceeds to Step 626.

In Step 619 a determination is made about whether the VRQ for the VRG-EPP pair is full. In one embodiment of the invention, VRQ is deemed "full" when (i) the number of packets in the VRQ exceeds a pre-determined threshold, (ii) the particular VRQ is using more than a pre-defined amount of shared memory, where the memory is shared, for example, with other VRQs, or (iii) all credits associated with a VRQ are currently exhausted where the amount of memory associated with the VRQ is implemented using a credit scheme such as a leaky bucket algorithm. Those skilled in the art will appreciate that other mechanisms to determine whether the VRQ is "full" may be used without departing from the invention. If the VRQ for the VRG-EPP pair is full, the process proceeds to Step 626; other the process proceeds to Step 620.

In Step 620, a determination is made about whether the VRQ for the VRG-EPP pair is empty. If the VRQ for the VRG-EPP pair is empty, the process proceeds to Step 622; otherwise the process proceeds to Step 614. In Step 622, the usage data from the EPP is obtained. The usage data for the EPP may be obtained from the statistics for the VTS. In Step 624, a determination is made about whether the EPP usage is low. In one embodiment of the invention, the VTS (or a component therein), the VRCL or a component external to the VTS (e.g., VCC (298) in FIG. 2B) sets EPP usage thresholds, which are used to make the determination in Step 624. In one embodiment of the invention, EPP usage is determined to be low when less than a pre-determined number of packets have been sent to the EPP from the VRQ drainer in a pre-determined time period. If the EPP usage is low, the process proceeds to Step 616; otherwise the process proceeds to Step 614.

In Step 626, the packet is dropped by the VTS. In one embodiment of the invention, Steps 610-626 are performed by the VRCL enqueuer. Further, though not shown in FIG. 6A, if the source of the packet is not permitted to transmit packets to the destination of packet (e.g., as determined by the header information in the packet) based on the VRCL, then the packet is dropped prior to Step 610.

Referring to FIG. 6B, In Step 628, the VRQ drainer starts the process of scheduling the transmission of the next packet. In Step 630, a determination is made about whether a cut-through packet is received by the VRQ drainer. If a cut-through packet is received, the process proceeds to Step 632; otherwise the process proceeds to Step 636.

In Step 632, a determination is made about whether to prioritize the cut-through packet. The determination in Step 632 may be based, in part, on whether queued packets in the VRQ have any minimum latency guarantees and, if so, whether those guarantees will be met if the cut-through packet is prioritized. The determination in Step 632 may also be used to prevent an excess of cut-through packets from effectively blocking packets queued in the VRQ. If the cut-through packet is to be prioritized, the process proceeds to Step 634; otherwise the process proceeds to Step 636. If the cut-through packet is not prioritized, the cut-through packet may be temporarily buffered in the VRQ drainer. In Step 634, the cut-through packet is scheduled for transmission.

In Step 636, a VRQ is selected. In one embodiment of the invention, the selection of a VRQ is based on a policy specified by the VCC and/or VRCL. Alternatively, the selection may be based on a selection algorithm implemented by the VRQ. Examples of selection algorithms include, but are not limited to, round-robin (including deficit, weighted, or modified-deficit), fair queuing (including weighted fair queuing). Further examples of selection algorithms may include drain rate controls on individual queues such as single or double leaky bucket drain rate schemes. Further examples of selection algorithms may preferentially select or modify the selection weight or VRQs that operate below some allocated threshold or thresholds. In Step 638, a determination is made about whether the VRQ (selected in Step 636) is empty. If the VRQ (selected in Step 636) is empty, the process proceeds to Step 628; otherwise the process proceeds to Step 640.

In Step 640, a packet in the selected VRQ is obtained. In one embodiment of the invention, the VRQ is a first-in first-out (FIFO) queue and the packet that is at the "front" of the VRQ is obtained. Alternatively, if the packets are tagged or otherwise prioritized in the VRQ, then the packet with the highest priority is obtained. In Step 642, the packet is scheduled for transmission.

Figure 7:
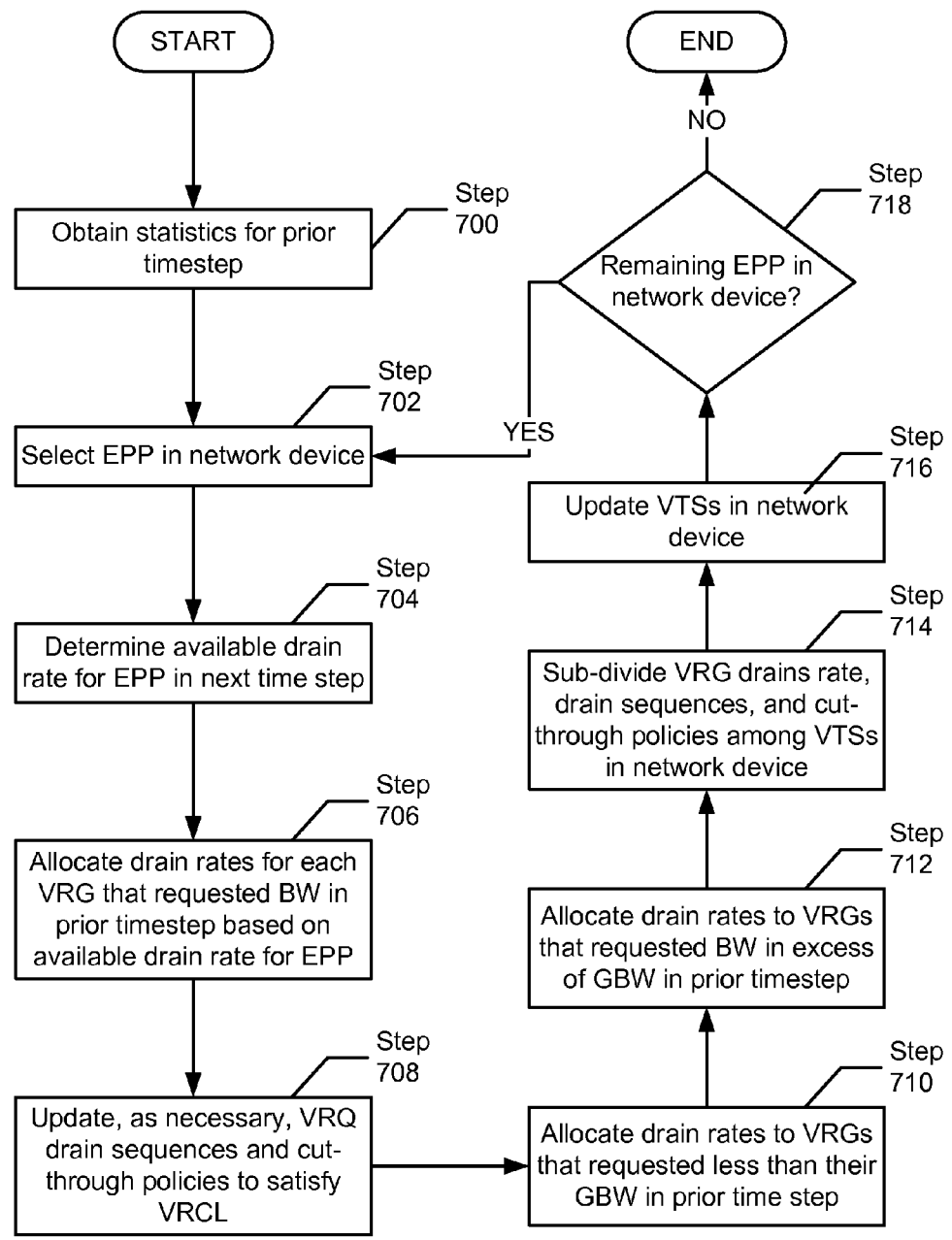

FIG. 7 shows a flowchart in accordance with one embodiment of the invention. More specifically, FIG. 7 shows a method performed by the vCoherence Controller (VCC) in one or more embodiments of the invention. In one embodiment of the invention, Marco-level policies are determined and implemented as a result of performing the steps in FIG. 7.

In Step 700, the statistics for the prior time step are obtained. Those skilled in the art will appreciate that the statistics may be continuously received from the VRS (e.g., 293 n FIG. 2C). Alternatively, the statistics may be received at set intervals (which may or may not be uniform across all VRSs) or once a certain amount of data is collected by a VTS Snooper or VRS. In another embodiment of the invention, the VCC may not receive statistics until they are requested by the VCC.

In Step 702, an egress physical port (EPP) (e.g., output port 4 in FIG. 3B) is selected. In Step 704, the available drain rate for the EPP (selected in Step 702) in the next time is determined. In one embodiment of the invention, the available drain rate is determined as the physical maximum bandwidth of the EPP. In another embodiment the available bandwidth may have been reduced by link-level congestion controls that pause transmission on the EPP or set the bandwidth to a reduced amount.

In Step 706, the available drain rate (determined in Step 704) is allocated across all VRGs that requested bandwidth (i.e., sent packets to the EPP) in the prior time step. In one embodiment of the invention, the allocation in Step 706 is made based at least, in-part, on guaranteed bandwidth limits specified in the VRCLs associated with the VRGs that sent packets to the EPP.

In Step 708, the VRQ drain sequences (see Step 636 in FIG. 6B) and cut-through policies (see FIG. 6A) are updated to satisfy each VRCL, where there is a VRCL associated with each VRG that sent packets to the EPP. In Step 710, to the extent there are excess drain rates to allocate, all or a portion of the remaining unallocated drain rates are allocated to VRGs that requested less than their guaranteed bandwidth in the prior time step.

In Step 712, to the extent there are excess drain rates to allocate, all or a portion of the remaining unallocated drain rates are allocated to VRGs that requested more than their guaranteed bandwidth (but less than the limited bandwidth) in the prior time step. In Step 714, the drain rates allocated to each of the VRGs in Steps 706, 710, and 712 are sub-divided across VTSs (and/or components therein) that process packets for the given VRGs. Further, a determination is made about how to apply the cut-through policies and VRQ drainer sequences for a VRG across the various VTSs (and/or components therein) that process packets for the given VRGs. Further, one or more of the above allocations of drain rates may include calculations using data collected over multiple previous requested bandwidths and drain rates.

In Step 716, the VTSs (or components therein) are updated in the network device using, for example, the appropriate vResource Policy Feedback Modules and VTS vResource Controllers. In Step 718, a determination is made about whether any other EPPs in the network device need to be processed. If there are remaining EPPs to process, then the process proceeds to Step 702; otherwise the process ends.

The method shown in FIG. 7 is performed at every time step. The time steps may be uniform in length or may be of various lengths. The length of the time steps and the magnitude of the changes of the operating parameters may be performed in accordance with known control loop theory. Furthermore different VRQs may have different time steps. For example, performance levels in the VRCLs for some VRQs may require more frequent modification to its drain rate than for other VRQs.

The following section describes various examples in accordance with one or more embodiments of the invention. The examples are intended to aid in the understanding of the invention and are not intended to limit the invention.

Figure 8:
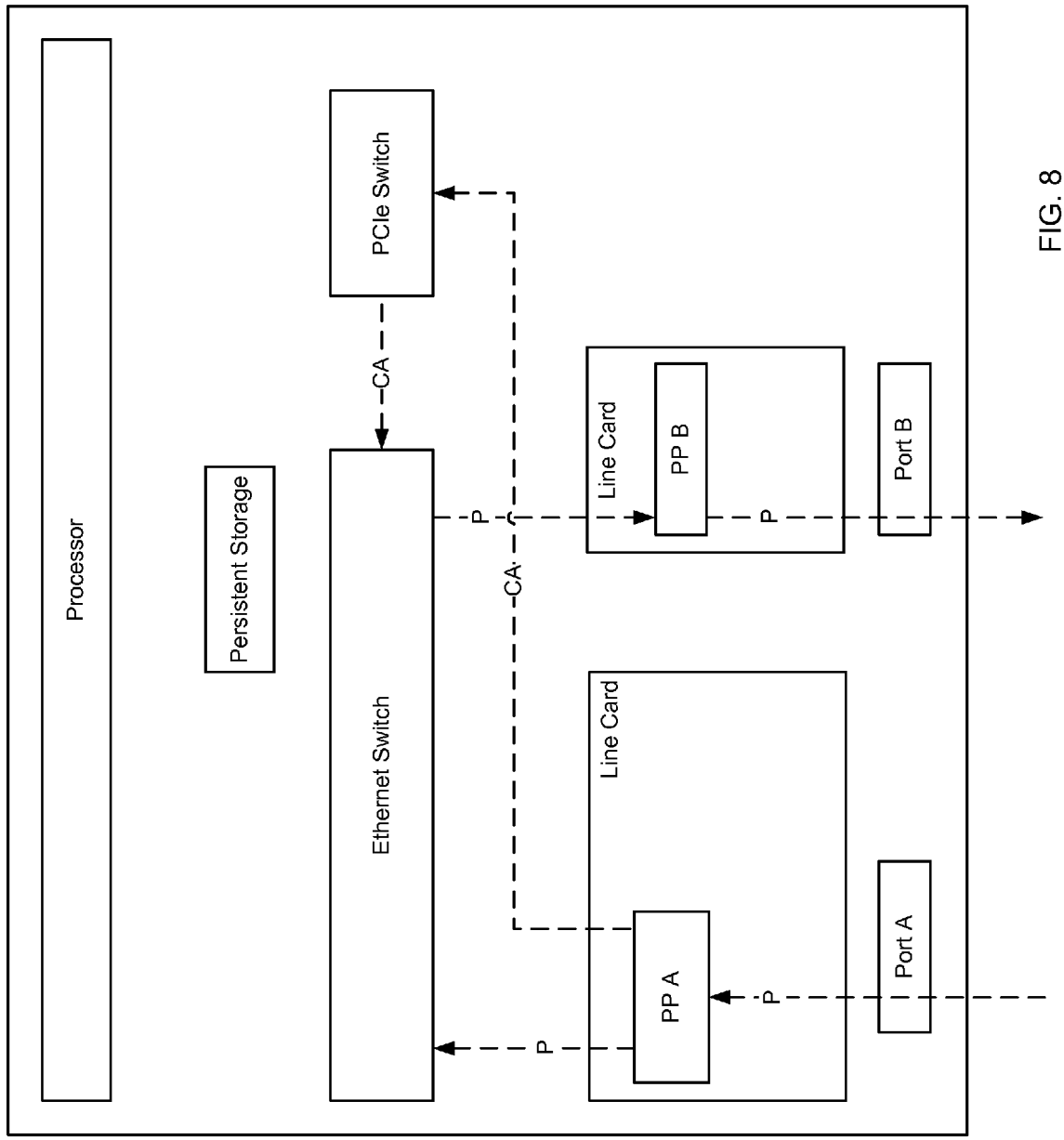
FIGS. 8-10 show examples in accordance with one or more embodiments of the invention.

FIG. 8 shows an example in accordance with one or more embodiments of the invention. Turning to the example in FIG. 8, assume that the network device is currently receiving packets from user 1 on Port A and is sending the packets (via the Ethernet Switch) to Port B. Further assume that user 1 has a low priority level of service and that port A is only processing user 1's packets. Because no other packets are being received by Port A, user 1's packets are being processed at a much higher level of service. At a later point in time, packets from user 2 are received at Port A. For purposes of this example, user 2 has a high priority level of service.

The receipt of the packets from user 2 results in a trigger condition being satisfied—namely, that low priority packets (i.e., user 1's packets) may block user 2's packets which would violate user 2's high level of service. In response, PP A issues a configuration action (via the PCIe switch) to the Ethernet switch. The configuration action modifies the packet processing of the Ethernet switch for a finite period of time, e.g., 100 ms, and specifies that during the next 100 ms packets tagged with CoS level 3 need to be processed at the highest priority and all other packets in the Ethernet switch need to be queued or dropped while the CoS level 3 packets are being processed.

In addition, the configuration action also modifies processing of packets at PP A, in particular, the configuration action triggers a header rewrite of the header information for all of user 2's packets. Specifically, all of user 2's packets are designated as CoS level 3. After the header information for user 2's packets is rewritten, user 2's packets are enqueued and drained in accordance with embodiments shown in FIGS. 6A and 6B.

Figure 9:
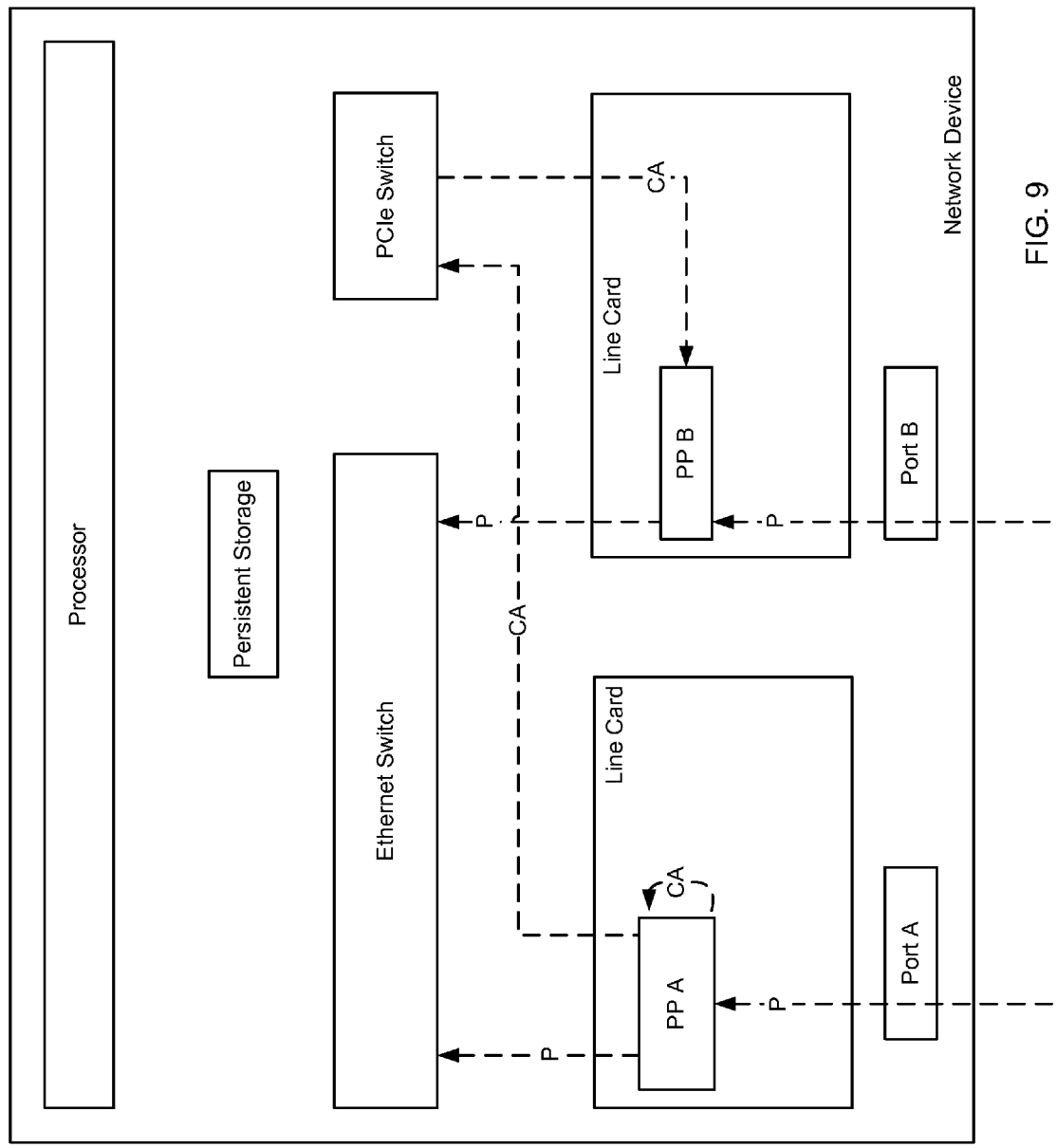

FIG. 9 shows an example in accordance with one or more embodiments of the invention. The network device shown in FIG. 9 is currently receiving packets at both Port A and Port B. The received packets are subsequently sent to the Ethernet switch. As discussed above, during the operation of the network device, various statistics related to the operation of the network device are ascertained. In some cases the statistics may be used by the PP (or more specifically VTS or other process executing on the PP) to determine an operating condition of the network device. For example, if there is an increase in the latency of packets being processed by the Ethernet switch, then the PP may determine that the Ethernet switch may be reaching its operating temperature threshold.

In the event that PP A detects the aforementioned increase in latency, PP A may determine that a trigger condition exists. In such cases, PP A issues a configuration action which (i) instructs PP A to drop all packets received from Port A for 50 ms and (ii) instructs PP B to drop all packets received from Port B for 50 ms. Further, the configuration action instructs PP A to implement the above modification at time 1 and PP B to implement the above modification at time 2. In another embodiment of the invention, NPU (248) in FIG. 2B (not shown in FIG. 9) can monitor the aggregate Ethernet switch statistics and perform similar rolling drops across ports A and B in order to limit the packet rate and, resultantly, the Ethernet switch temperature. NPU (248) may determine the manner in which to implement the rolling drops using predicted or previously modeled relationships between aggregate Ethernet switch statistics and Ethernet switch temperature.

Figure 10:
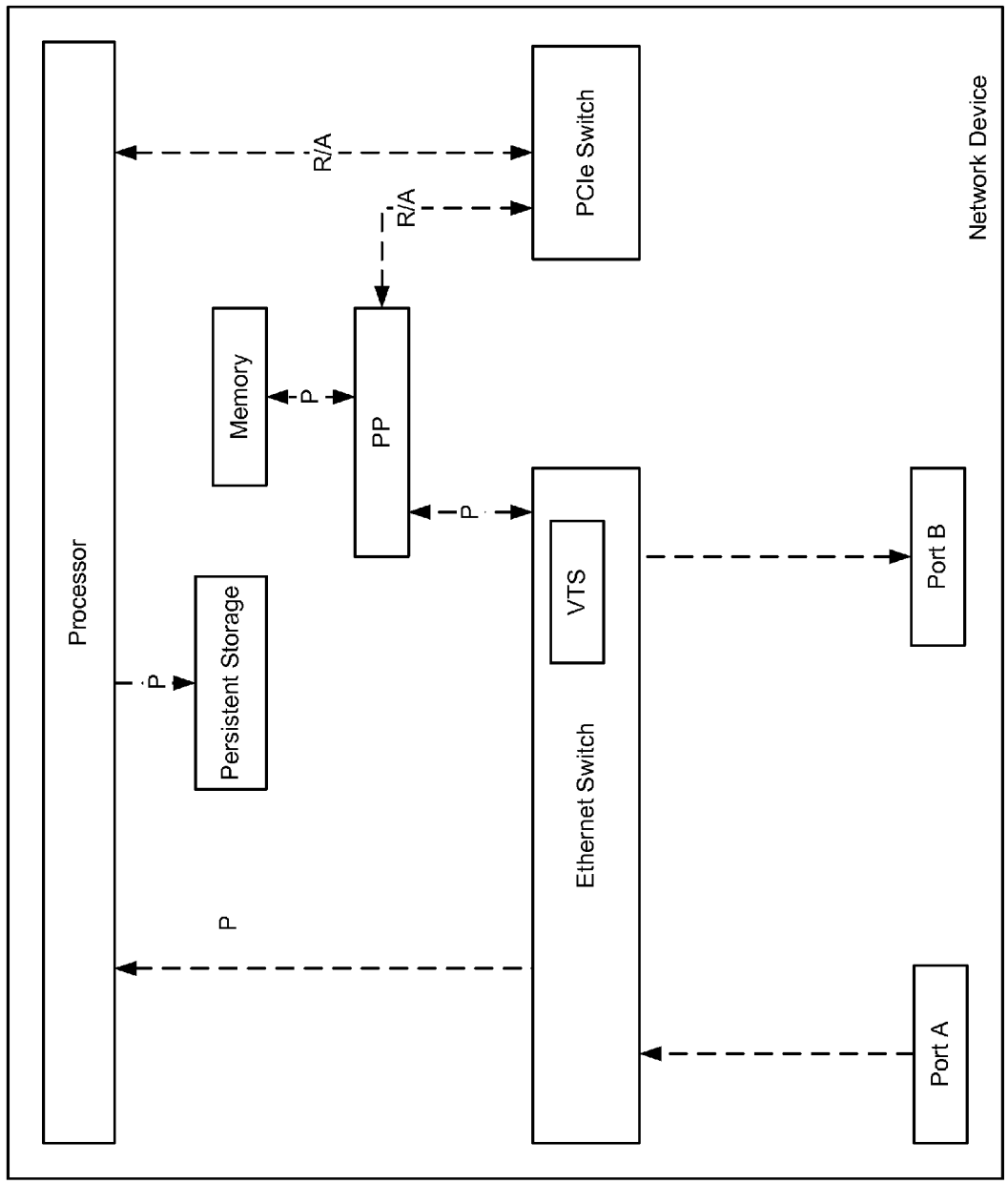

FIG. 10 shows an example in accordance with one or more embodiments of the invention. Assume the network device, at time 0, is receiving packets at Port A and then sending those packets to Port B via the Ethernet switch. At time 1, the network device receives a SYN packet from Port A. This matches a rule in the VTS in the Ethernet switch. In response to matching the rule, the Ethernet switch performs an action—namely sending the packet to the packet processor (PP). The receipt of the packet by PP satisfies a trigger condition—namely, a packet that includes a set SYN flag and a set ACK flag is received. The PP subsequently issues a configuration action. The configuration action, when performed by PP, creates a rule-specific action that is a conditional action. The "rule" that is associated with this action is denoted by a VRG-EPP pair (see FIG. 5). Further, the rule-specific action instructs the PP to store a copy of all packets received for the next 200 ms that are part of a TCP stream (of which the SYN packet is a part).

Subsequent to performing the configuration action, all packets received by the PP that are part of the TCP stream are stored in the memory attached to the PP.

The configuration action also results in a notification being issued to the processor via the PCIe switch. The notification informs the processor that packets for a particular TCP stream received for the next 200 ms are being stored by PP and if the processor would like to obtain a copy of the stored packets it must request the PP to send the packets to the processor.

In response to the notification, the processor sends a request to the PP to obtain the buffered packets for the TCP stream. The PP, in response, sends the buffered packets to the processor via the Ethernet switch. The processor, upon receipt of the packets, sends the packets to the persistent storage.

In the above example, the Ethernet switch performs the coarse control—namely obtain all packets that match a VRG-EPP pair and the PP exercises fine grain control by determining which of the packets received from the Ethernet switch are part of the TCP stream.

One or more embodiments of the invention may be implemented, at least in part, using software instructions. In such embodiments, the software instructions may be recorded (or otherwise stored) on any tangible non-transitory medium (e.g., random access memory (RAM), flash memory, compact disc (CD), a diskette, a tape, memory, or any other tangible computer readable storage).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
a port configured to receive a packet; and
a packet processor (PP) configured to:
receive the packet from the port;
in response to receiving the packet, make a first determination that a trigger condition exists for the received packet;
issue a configuration action in response to the first determination, wherein the configuration action, when performed by the network device, modifies a configuration of a component on the network device; and
in response to performing the configuration action:
create a virtual resource queue (VRQ) associated with an egress port in response to the configuration action;
store the packet in the VRQ;
issue a request to a processor in the network device to determine whether the processor requires a copy of contents in the VRQ; and
after issuing the request, receive a response to provide the copy of the contents in the VRQ to the processor.

2. The network device of claim 1, further comprising:
an Ethernet switch configured to:
receive the configuration action;
perform the configuration action to obtain a modified configuration for the Ethernet switch;
after performing the configuration action:
receive the packet from the PP; and
process the packet using the modified configuration.

3. The network device of claim 2, wherein the modified configuration comprises a new rule specifying how the Ethernet switch processes packets received from the PP.

4. The network device of claim 1, further comprising:
a second PP configured to:
receive the configuration action;
perform the configuration action to obtain a modified configuration for the second PP;
after performing the configuration action:
receive a second packet from a second port connected to the second PP; and
process the packet using the modified configuration.

5. The network device of claim 4, wherein the modified configuration comprises a new policy that is implemented by the second PP, wherein the new policy specifies how the second PP processes at least one packet received by the second PP.

6. The network device of claim 1, wherein the PP is further configured to:
in response to receiving the packet:
make a second determination that the packet is not associated with any rule;
based on the second determination, obtaining a default action; and
perform the default action.

7. The network device of claim 6, wherein performing the default action comprises:
creating a copy of the packet; and
sending the packet, via an Ethernet switch, to a second port on the network device; and
sending the copy of the packet, via the Ethernet switch, to a processor on the network device,
wherein the processor is configured to generate a rule using header information of the copy of the packet.

8. The network device of claim 6, wherein performing the default action comprises:
creating, by the PP, a copy of the packet;
sending the copy of the packet, via an Ethernet switch, to a processor on the network device, wherein the processor is configured to generate a rule using header information of the copy of the packet;
receiving the rule by the PP; and
processing, by the PP, the packet using the rule.

9. The network device of claim 8, wherein making the second determination that the packet is associated with the rule comprises obtaining header information from the packet, wherein the PP uses the header information to determine whether the packet is associated with the rule.

10. The network device of claim 9, wherein the header information comprises at least one selected from a group consisting of a media access control (MAC) address, an internet protocol (IP) address, and a transmission control protocol (TCP) header.

11. The network device of claim 1, wherein the PP is further configured to:
in response to receiving the packet:
make a second determination that the packet is associated with a rule;
based on the second determination, obtaining a rule-specific action associated with the rule; and
performing the rule-specific action.

12. The network device of claim 11, wherein performing the rule-specific action comprises:
creating, by the PP, a copy of the packet; and
sending the copy of the packet to a processor in the network device, wherein the processor is configured to generate analytics information about the network device using the copy of the packet.

13. The network device of claim 11, wherein performing the rule-specific action comprises:
enqueuing the packet in a virtual resource queue (VRQ) using header information of the packet.

14. The network device of claim 1, wherein the network device is a switch.

15. The network device of claim 1, wherein the port receives the packet from a network entity.

16. The network device of claim 1, wherein the configuration action is communicated to the component using at least one selected from a group consisting of Ethernet and Peripheral Component Interconnect (PCI).

17. The network device of claim 1, wherein the configuration action only modifies the configuration of the component on the network device for a finite period of time.

18. The network device of claim 1, wherein the trigger condition corresponds to a pattern of packets received by the PP, wherein the packet is part of the pattern of packets.

19. The network device of claim 1, wherein the trigger condition corresponds to a type of packet.

20. The network device of claim 1, wherein the trigger condition corresponds to an operating condition on the network device, wherein the operating condition is determined using analytics of the network device, and wherein the analytics of the network device are derived, in part, using the packet.

21. The network device of claim 1, further comprising:
an Ethernet switch interposed between the PP and the processor, wherein the Ethernet switch is configured to:
receive the copy of the contents of the VRQ from the PP, and
provide the copy of the contents of the VRQ to the processor, wherein the Ethernet switch is operatively connected to the processor via Ethernet.

22. The network device of claim 21, wherein the copy of the contents of the VRQ is transmitted to the Ethernet switch using one selected from a group consisting of Ethernet and Peripheral Component Interconnect (PCI).

23. A network device, comprising:
a port configured to receive a packet;
a packet processor;
an Ethernet switch configured to:
   receive the packet from the port; and
   in response to a first determination that the packet satisfies a rule, sending the packet to the packet processor;
the packet processor (PP) configured to:
   receive the packet from the Ethernet switch;
   make a second determination that a trigger condition exists for the received packet;
   issue a configuration action in response to the second determination, wherein the configuration action, when performed by the network device, modifies a configuration of a component on the network device, wherein the PP is not directly connected to any port of the network device; and
in response to performing the configuration action:
   create a virtual resource queue (VRQ) associated with an egress port in response to the configuration action;
   store the packet in the VRQ;
   issue a request to a processor in the network device to determine whether the processor requires a copy of contents in the VRQ; and
   after issuing the request, receive a response to provide the copy of the contents in the VRQ to the processor.

24. The network device of claim 23, wherein performing the configuration action results in a modified Ethernet switch configuration, wherein the packet is sent from the PP to the Ethernet switch after the Ethernet switch performs the configuration action, and wherein the packet is processed using the modified Ethernet switch configuration.

25. A network device, comprising:
a port configured to receive a packet;
a processor configured to:
   receive the packet from an Ethernet switch interposed between the port and the processor;
   make a first determination that a trigger condition exists for the received packet;
   issue a configuration action in response to the first determination, wherein the configuration action, when performed by the network device, modifies a configuration of a component on the network device, wherein the component is one selected from a group consisting of a packet processor and the Ethernet switch; and
in response to performing the configuration action:
   create a virtual resource queue (VRQ) associated with an egress port in response to the configuration action;
   store the packet in the VRQ;
   issue a request to a processor in the network device to determine whether the processor requires a copy of contents in the VRQ; and
   after issuing the request, receive a response to provide the copy of the contents in the VRQ to the processor.

\* \* \* \* \*